US007969973B2

(12) United States Patent
Wakai

(10) Patent No.: US 7,969,973 B2
(45) Date of Patent: Jun. 28, 2011

(54) INFORMATION PROCESSING APPARATUS, METHOD FOR CONTROLLING THE SAME, AND PROGRAM

(75) Inventor: Masanori Wakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1245 days.

(21) Appl. No.: 11/539,291

(22) Filed: Oct. 6, 2006

(65) Prior Publication Data
US 2007/0174497 A1    Jul. 26, 2007

(30) Foreign Application Priority Data
Oct. 17, 2005    (JP) ................... 2005-301844

(51) Int. Cl.
*H04L 12/28* (2006.01)

(52) U.S. Cl. ................... 370/389; 370/400; 375/240.01; 348/211.3

(58) Field of Classification Search .................. None
See application file for complete search history.

(56) References Cited

U.S. PATENT DOCUMENTS

| | | | | |
|---|---|---|---|---|
| 6,049,353 | A * | 4/2000 | Gray | 348/159 |
| 6,947,072 | B1 * | 9/2005 | Kaneko et al. | 348/149 |
| 7,590,178 | B2 * | 9/2009 | Bergen et al. | 375/240.12 |
| 2002/0178116 | A1 * | 11/2002 | Yamasaki | 705/39 |
| 2004/0086088 | A1 * | 5/2004 | Naidoo et al. | 379/37 |
| 2004/0086089 | A1 * | 5/2004 | Naidoo et al. | 379/37 |
| 2004/0086090 | A1 * | 5/2004 | Naidoo et al. | 379/37 |
| 2004/0086091 | A1 * | 5/2004 | Naidoo et al. | 379/37 |
| 2005/0058321 | A1 * | 3/2005 | Buehler | 382/103 |
| 2005/0078852 | A1 * | 4/2005 | Buehler | 382/103 |
| 2005/0078853 | A1 * | 4/2005 | Buehler et al. | 382/103 |
| 2005/0102704 | A1 * | 5/2005 | Prokupets et al. | 725/118 |
| 2005/0174429 | A1 * | 8/2005 | Yanai | 348/148 |
| 2005/0200714 | A1 * | 9/2005 | Marchese | 348/211.3 |
| 2005/0225635 | A1 * | 10/2005 | Meitzler et al. | 348/148 |
| 2005/0231357 | A1 * | 10/2005 | Kanayama et al. | 340/539.13 |
| 2005/0285941 | A1 * | 12/2005 | Haigh et al. | 348/155 |

FOREIGN PATENT DOCUMENTS

| | | |
|---|---|---|
| JP | 08-063419 A | 3/1996 |
| JP | 10-117388 A | 5/1998 |
| JP | 11-317745 A | 11/1999 |
| JP | 2000-222318 A | 8/2000 |
| JP | 2002-007255 A | 1/2002 |
| JP | 2004-171188 A | 6/2004 |

* cited by examiner

*Primary Examiner* — Bob A Phunkulh
(74) *Attorney, Agent, or Firm* — Canon USA, Inc. IP Div

(57) ABSTRACT

An information processing apparatus prevents or reduces an increase in storage capacity when setting information of a device present on a network is customized and held. Difference information with respect to common information of the setting information on the network is recorded as difference information of the setting information. The common information is obtained from the network. The recorded difference information and the obtained common information are combined together to generate combined setting information. The combined setting information is applied.

10 Claims, 43 Drawing Sheets

FIG. 7

CONDITION CORRESPONDING RECORDING PLACE DEFINITION DATA

| CONDITION | RECORDING PLACE | |
|---|---|---|
| NONE | CENTER SERVER | ~701 |
| LIMIT DEVICE | STORAGE AREA OF CORRESPONDING DEVICE | ~702 |
| LIMIT TERMINAL | STORAGE AREA OF CORRESPONDING TERMINAL | ~703 |
| LIMIT PLACE OF DEVICE | STORAGE AREA OF CORRESPONDING ACCESS POINT | ~704 |
| LIMIT PLACE OF TERMINAL | STORAGE AREA OF CORRESPONDING ACCESS POINT | ~705 |
| ⋮ | ⋮ | |

FIG. 9

DIFFERENCE SETTING INFORMATION
RECORDING DATA OF CENTER SERVER 201

| ITEM | CONTENTS | |
|---|---|---|
| STANDARD PAN RANGE | North, West, South, East | ~901 |
| STANDARD ZOOM RANGE | 1 TO 100 MAGNIFICATIONS | ~902 |
| STANDARD RESOLUTION | XGA | ~903 |
| ⋮ | ⋮ | |

DEVICE DIFFERENCE SETTING INFORMATION
RECORDING DATA OF CHILD ROOM ACCESS POINT 203

| ITEM | CONTENTS | |
|---|---|---|
| STANDARD PAN RANGE | North | ~904 |

FIG. 12

SETTING INFORMATION WHEN CAMERA 217 IS USED FOR TV 213

| ITEM | CONTENTS | |
|---|---|---|
| STANDARD PAN RANGE | North | ~1201 |
| STANDARD ZOOM RANGE | 1 TO 100 MAGNIFICATIONS | ~1202 |
| STANDARD RESOLUTION | XGA | ~1203 |
| : | : | |

FIG. 16

DIFFERENCE SETTING INFORMATION
RECORDING DATA OF CENTER SERVER 201

| ITEM | CONTENTS | |
|---|---|---|
| STANDARD PAN RANGE | North, West, South, East | ~1601 |
| STANDARD ZOOM RANGE | 1 TO 100 MAGNIFICATIONS | ~1602 |
| STANDARD RESOLUTION | XGA | ~1603 |
| ⋮ | ⋮ | |

DEVICE DIFFERENCE SETTING INFORMATION
RECORDING DATA OF CHILD ROOM ACCESS POINT 203

| ITEM | CONTENTS | |
|---|---|---|
| STANDARD PAN RANGE | North | ~1604 |

DIFFERENCE SETTING INFORMATION RECORDING DATA OF CAMERA 215

| ITEM | CONTENTS | |
|---|---|---|
| STANDARD RESOLUTION | QVGA | ~1605 |

FIG. 18

SETTING INFORMATION WHEN CAMERA 215 IS USED FOR TV 213

| ITEM | CONTENTS | |
|---|---|---|
| STANDARD PAN RANGE | North | ~1801 |
| STANDARD ZOOM RANGE | 1 TO 100 MAGNIFICATIONS | ~1802 |
| STANDARD RESOLUTION | QVGA | ~1803 |
| ⋮ | ⋮ | |

FIG. 19

DIFFERENCE SETTING INFORMATION
RECORDING DATA OF CENTER SERVER 201

| ITEM | CONTENTS | |
|---|---|---|
| STANDARD PAN RANGE | North, West, South, East | ~1901 |
| STANDARD ZOOM RANGE | 1 TO 100 MAGNIFICATIONS | ~1902 |
| STANDARD RESOLUTION | XGA | ~1903 |
| : | : | |

DEVICE DIFFERENCE SETTING INFORMATION
RECORDING DATA OF CHILD ROOM ACCESS POINT 203

| ITEM | CONTENTS | |
|---|---|---|
| STANDARD PAN RANGE | North | ~1904 |

DIFFERENCE SETTING INFORMATION RECORDING DATA OF TV 211

| ITEM | CONTENTS | |
|---|---|---|
| STANDARD ZOOM RANGE | 5 TO 100 MAGNIFICATIONS | ~1905 |

FIG. 21

SETTING INFORMATION WHEN CAMERA 217 IS USED FOR TV 211

| ITEM | CONTENTS | |
|---|---|---|
| STANDARD PAN RANGE | North | ~2101 |
| STANDARD ZOOM RANGE | 5 TO 100 MAGNIFICATIONS | ~2102 |
| STANDARD RESOLUTION | XGA | ~2103 |
| : | : | |

FIG. 23

DIFFERENCE SETTING INFORMATION
RECORDING DATA OF CENTER SERVER 201

| ITEM | CONTENTS | |
|---|---|---|
| STANDARD PAN RANGE | North, West, South, East | ~2301 |
| STANDARD ZOOM RANGE | 1 TO 100 MAGNIFICATIONS | ~2302 |
| STANDARD RESOLUTION | XGA | ~2303 |
| ⋮ | ⋮ | |

DEVICE DIFFERENCE SETTING INFORMATION
RECORDING DATA OF LIVING ROOM ACCESS POINT 207

| ITEM | CONTENTS | |
|---|---|---|
| STANDARD PAN RANGE | East | ~2304 |

DIFFERENCE SETTING INFORMATION RECORDING DATA OF TV 211

| ITEM | CONTENTS | |
|---|---|---|
| STANDARD ZOOM RANGE | 5 TO 100 MAGNIFICATIONS | ~2305 |

DIFFERENCE SETTING INFORMATION RECORDING DATA OF CAMERA 2201

| ITEM | CONTENTS | |
|---|---|---|
| STANDARD RESOLUTION | QVGA | ~2306 |

FIG. 25

SETTING INFORMATION WHEN CAMERA 2201 IS USED FOR TV 211

| ITEM | CONTENTS | |
|---|---|---|
| STANDARD PAN RANGE | East | ~2501 |
| STANDARD ZOOM RANGE | 5 TO 100 MAGNIFICATIONS | ~2502 |
| STANDARD RESOLUTION | QVGA | ~2503 |
| : | : | |

FIG. 27

DIFFERENCE SETTING INFORMATION
RECORDING DATA OF CENTER SERVER 201

| ITEM | CONTENTS | |
|---|---|---|
| STANDARD PAN RANGE | North, West, South, East | ~2701 |
| STANDARD ZOOM RANGE | 1 TO 100 MAGNIFICATIONS | ~2702 |
| STANDARD RESOLUTION | XGA | ~2703 |
| : | : | |

OPERATION TERMINAL DIFFERENCE SETTING INFORMATION
RECORDING DATA OF CHILD ROOM ACCESS POINT 203

| ITEM | CONTENTS | |
|---|---|---|
| STANDARD PAN RANGE | North | ~2704 |

FIG. 29

SETTING INFORMATION WHEN CAMERA 217 IS USED FOR TV 213

| ITEM | CONTENTS | |
|---|---|---|
| STANDARD PAN RANGE | North, West, South, East | ~2901 |
| STANDARD ZOOM RANGE | 1 TO 100 MAGNIFICATIONS | ~2902 |
| STANDARD RESOLUTION | XGA | ~2903 |
| ⋮ | ⋮ | |

FIG. 31

| SETTING INFORMATION WHEN CAMERA 217 IS USED FOR TV 209 | | |
|---|---|---|
| ITEM | CONTENTS | |
| STANDARD PAN RANGE | North | ~3101 |
| STANDARD ZOOM RANGE | 1 TO 100 MAGNIFICATIONS | ~3102 |
| STANDARD RESOLUTION | XGA | ~3103 |
| : | : | |

FIG. 33

DIFFERENCE SETTING INFORMATION
RECORDING DATA OF CENTER SERVER 201

| ITEM | CONTENTS | |
|---|---|---|
| STANDARD PAN RANGE | North, West, South, East | ~3301 |
| STANDARD ZOOM RANGE | 1 TO 100 MAGNIFICATIONS | ~3302 |
| STANDARD RESOLUTION | XGA | ~3303 |
| : | : | |

DEVICE DIFFERENCE SETTING INFORMATION
RECORDING DATA OF LIVING ROOM ACCESS POINT 207

| ITEM | CONTENTS | |
|---|---|---|
| STANDARD PAN RANGE | East | ~3304 |

DIFFERENCE SETTING INFORMATION RECORDING DATA OF TV 211

| ITEM | CONTENTS | |
|---|---|---|
| STANDARD ZOOM RANGE | 5 TO 100 MAGNIFICATIONS | ~3305 |

DIFFERENCE SETTING INFORMATION RECORDING DATA OF CAMERA 2201

| ITEM | CONTENTS | |
|---|---|---|
|  |  | ~3306 |

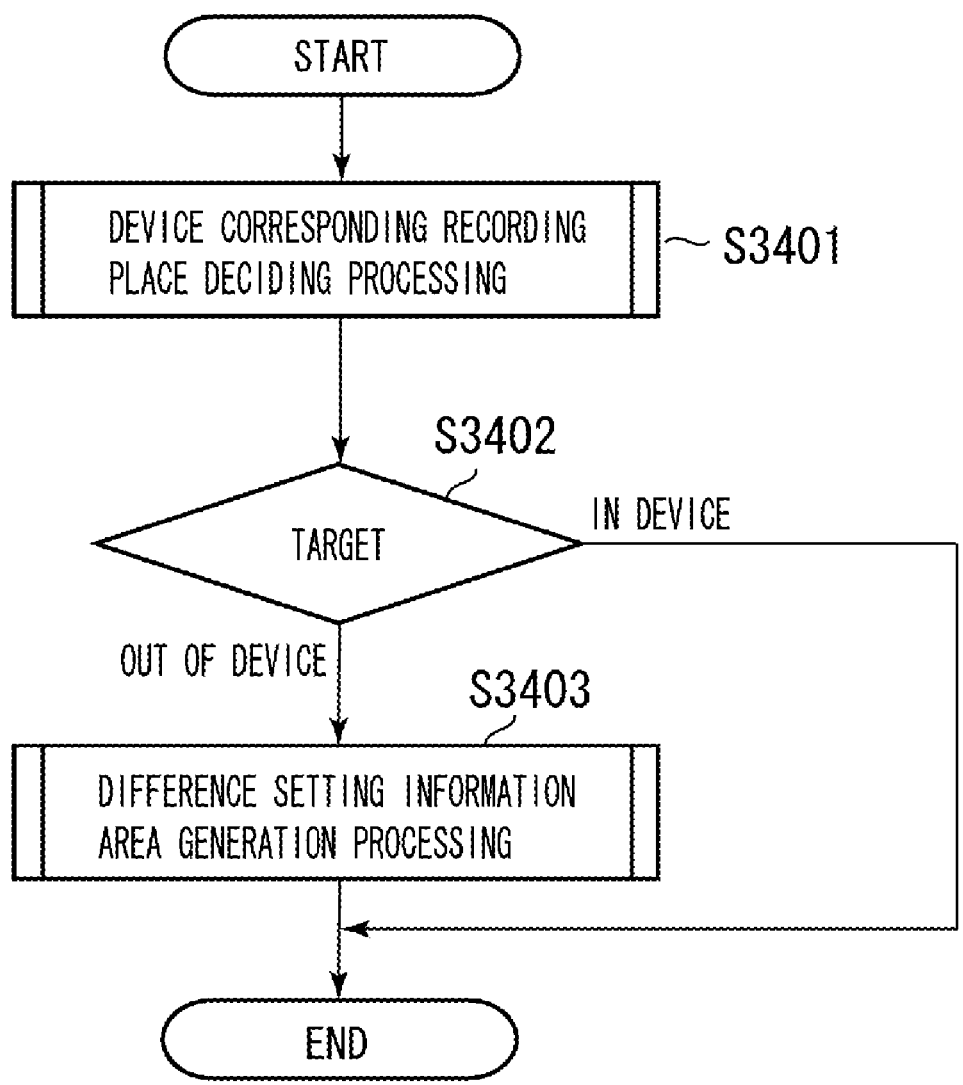

FIG. 35

DIFFERENCE SETTING INFORMATION
RECORDING DATA OF CENTER SERVER 201

| ITEM | CONTENTS | |
|---|---|---|
| STANDARD PAN RANGE | North, West, South, East | ~3501 |
| STANDARD ZOOM RANGE | 1 TO 100 MAGNIFICATIONS | ~3502 |
| STANDARD RESOLUTION | XGA | ~3503 |
| ⋮ | ⋮ | |

DEVICE DIFFERENCE SETTING INFORMATION
RECORDING DATA OF LIVING ROOM ACCESS POINT 207

| ITEM | CONTENTS | |
|---|---|---|
| STANDARD PAN RANGE | East | ~3504 |

DIFFERENCE SETTING INFORMATION RECORDING DATA OF TV 211

| ITEM | CONTENTS | |
|---|---|---|
| STANDARD ZOOM RANGE | 5 TO 100 MAGNIFICATIONS | ~3505 |

DIFFERENCE SETTING INFORMATION RECORDING DATA OF NEW CAMERA

| ITEM | CONTENTS | |
|---|---|---|
|  |  | ~3506 |

FIG. 38

ALTERNATIVE RECORDING PLACE DEFINITION DATA

| TARGET RECORDING PLACE | ALTERNATIVE RECORDING PLACE | |
|---|---|---|
| CENTER SERVER | ALL ACCESS POINTS<br>OR ALL DEVICES<br>OR ALL OPERATION TERMINALS | ~3801 |
| ACCESS POINT | CENTER SERVER<br>OR ALL DEVICES OF CORRESPONDING PLACE<br>OR ALL OPERATION TERMINALS | ~3802 |

FIG. 41

CONDITION CORRESPONDING RECORDING PLACE DEFINITION DATA

| CONDITION | RECORDING PLACE | |
|---|---|---|
| NONE | CENTER SERVER | 4101 |
| ABSTRACTLY LIMIT DEVICE | CENTER SERVER | 4102 |
| LIMIT DEVICE | STORAGE AREA OF CORRESPONDING DEVICE | 4103 |
| LIMIT TERMINAL | STORAGE AREA OF CORRESPONDING TERMINAL | 4104 |
| LIMIT PLACE OF DEVICE | STORAGE AREA OF CORRESPONDING ACCESS POINT | 4105 |
| LIMIT PLACE OF TERMINAL | STORAGE AREA OF CORRESPONDING ACCESS POINT | 4106 |
| ⋮ | ⋮ | |

FIG. 42

DIFFERENCE SETTING INFORMATION
RECORDING DATA OF CENTER SERVER 201

| ITEM | CONTENTS | |
|---|---|---|
| STANDARD PAN RANGE | North, West, South, East | ~4201 |
| STANDARD ZOOM RANGE | 1 TO 470 MAGNIFICATIONS | ~4202 |
| STANDARD RESOLUTION | XGA | ~4203 |
| : | : | |

OPTICAL ZOOM CAMERA DIFFERENCE SETTING INFORMATION
RECORDING DATA OF CENTER SERVER 201

| ITEM | CONTENTS | |
|---|---|---|
| STANDARD RESOLUTION | SXGA | ~4204 |

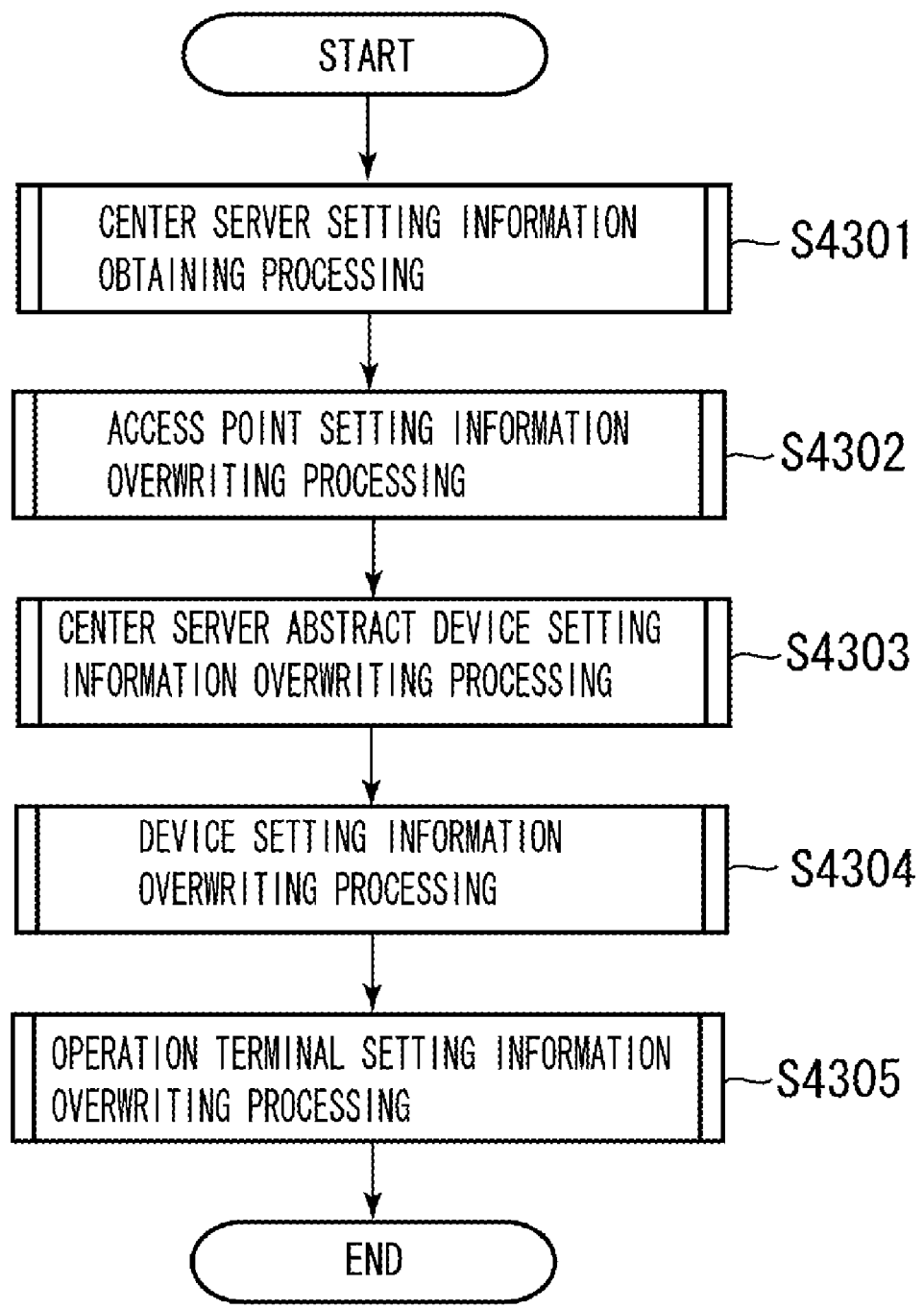

INFORMATION PROCESSING APPARATUS, METHOD FOR CONTROLLING THE SAME, AND PROGRAM

BACKGROUND OF THE INVENTION

1. Field of the invention

The present invention relates to an information processing apparatus configured to be in communication with an external apparatus via a network, a method for controlling the information processing apparatus, and a program.

2. Description of the Related Art

Setting information of a device present on a network has conventionally been customized and held to enable each user to use the device by optimal setting. For example, in the case of a network printer, a default value is held as setting information in an operation terminal of each user to reduce time and labor of resetting each time. For example, "two-sided printing in 2 in 1" can be set as a default value for a user A, and "two-sided printing" can be set as a default value for a user B. However, the setting information must be held in the operation terminal of each user, and the setting information cannot simply be used when the same user uses the device in the other operation terminal. Consequently, resetting must be carried out on the operation terminal. In the operation terminal, a nonvolatile memory must be disposed to sufficiently hold the setting information even when power is cut off. Thus, various technologies have been proposed to solve the problems.

For example, Japanese Patent Application Laid-Open No. 2000-222318 discusses a method of obtaining setting information from a server at the time of starting to execute own setting, thereby enabling reduction of a storage capacity of a client side and making-common of setting information among a plurality of devices. However, according to the method discussed in Japanese Patent Application Laid-Open No. 2000-222318, as all pieces of setting information are concentrated on the server side, a storage capacity necessary for the server side increases. Besides, it is impossible to deal with different use of setting information corresponding to different conditions (device, installation place, operation terminal, and the like).

Japanese Patent Application Laid-Open No. 11-317745 discusses a method of holding setting data of network constituting apparatuses facing each other, thereby enabling recovery when abnormalities occur. According to the method discussed in Japanese Patent Application Laid-Open No. 11-317745, as the holding of setting data can be used only as a backup for recovery, it is impossible to realize a reduction of the storage capacity of the operation terminal side and common-use of the setting information among the plurality of devices.

Japanese Patent Application Laid-Open No. 10-117388 discusses a method of disposing a setting information generation unit for generating setting information in a home information terminal and a setting information storage unit for storing information generated by the setting information generation unit on a device side. Thereby, the device can be used even when the set unit fails while a cost increase of the device side for the set unit is prevented. According to the method discussed in Japanese Patent Application Laid-Open No. 10-117388, as all pieces of setting information must be held on the device side, the storage capacity necessary for the device side increases. Besides, it is impossible to deal with different use of the setting information corresponding to different conditions (device, installation place, operation terminal, and the like).

Japanese Patent Application Laid-Open No. 08-063419 discusses a method of instructing a client to update a setting file following a change in the setting file, thereby enabling automatic updating of the setting of the client side and prevention of mismatching of setting information between a server and the client. According to the method discussed in Japanese Patent Application Laid-Open No. 08-063419, as the setting information must be held by each device, the storage capacities of the server and the device both increase.

Therefore, the aforementioned approaches do have some inherent drawbacks. It would be desirable to provide an apparatus and method for controlling the same which has been made in consideration of the above problems, and is directed to preventing an increase in storage capacity and further directed to using a device in an optimal state.

SUMMARY OF THE INVENTION

The present invention has been made in consideration of the above problems, and is directed to preventing an increase in storage capacity. The present invention is also directed to using a device in an optimal state.

According to an aspect of the present invention, an information processing apparatus is provided which is configured to be in communication with an external apparatus having common information of setting information via a network. The information processing apparatus includes a difference information recording unit configured to record difference information with respect to the common information; an obtaining unit configured to obtain the common information; a combination unit configured to combine the difference information with the obtained common information to generate combined setting information; and an application unit configured to apply the generated combined setting information.

According to another aspect of the present invention, the information processing apparatus may further include a designation unit configured to be in communication with a plurality of information processing apparatuses and configured to designate a designee information processing apparatus to which the setting information is applied; and a recording apparatus deciding unit configured to determine the information processing apparatus on which the difference information is recorded in accordance with the designation.

According to yet another aspect of the present invention, the information processing apparatus may also include a plurality-of-difference-information obtaining units configured to obtain a plurality of difference information recorded on a plurality of information processing apparatuses decided by the recording apparatus deciding unit; a plurality-of-information combination units configured to combine together the common information obtained by the obtaining unit, the difference information recorded on the difference information recording unit, and the plurality of difference information obtained by the plurality-of-difference-information obtaining unit to generate combined setting information; and a plurality-of-information application units configured to apply the combined setting information generated by the plurality-of-information combination unit.

Furthermore, according to yet another aspect of the present invention, the information processing apparatus may further include a deletion unit configured to delete difference information with respect to the setting information. In addition, according to yet another aspect of the present invention, the information processing apparatus may also include an addition unit configured to add new difference information with respect to the setting information.

Moreover, according to another aspect of the present invention, the information processing apparatus may further include an alternative recording apparatus deciding unit configured to decide an alternative recording apparatus if no recording apparatus is decided by the recording apparatus deciding unit. Additionally, according to another aspect of the present invention, the plurality of information processing apparatuses may be configured in hierarchical layers, wherein the designation unit designates one of the hierarchical layers, and wherein the recording apparatus deciding unit decides a recoding apparatus according to the designated layer.

Furthermore, according to yet another aspect of the present invention, the setting information may include at least one of camera setting information, printer setting information, and web page setting information. Also, according to yet another aspect of the present invention, the plurality of information processing apparatuses may include at least one of an access point, an operation apparatus, and an operated apparatus.

According to yet another aspect of the present invention, a method is provided for controlling an information processing apparatus in communication with an external apparatus having common information of setting information via a network. The method includes recording difference information with respect to the common information on a difference information recording unit; obtaining the common information; a combination step of combining the recorded difference information with the obtained common information obtained to generate combined setting information; and applying the combined setting information.

Moreover, according to yet another aspect of the present invention, a computer-readable program is provided for executing a control method for an information processing apparatus connected to an external apparatus having common information of setting information via a network. The computer-readable program includes program code for recording difference information with respect to the common information on a difference information recording unit; program code for obtaining the common information; program code for combining the recorded difference information with the obtained common information to generate combined setting information; and program code for applying the combined setting information.

Furthermore, according to still yet another aspect of the present invention, an information processing system is provided including a server and an information processing apparatus in communication via a network. Here, the information processing system includes a common information recording unit configured to record common information of setting information; a difference information recording unit configured to record difference information with respect to the common information recorded on the common information recoding unit; a combination unit configured to combine the difference information recorded on the difference information recording unit with the common information recorded on the common information recording unit to generate combined setting information; and an application unit configured to apply the combined setting information generated by the combination unit.

Also, according to an aspect of the present invention, there is an effect of preventing an increase in storage capacity. Moreover, there is an effect of enabling use of a device in an optimal state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram showing an example of condition corresponding recording place definition data according to an exemplary embodiment of the present invention.

FIG. 9 is a diagram showing an example of difference setting information recording data according to an exemplary embodiment of the present invention.

FIG. 12 is a diagram showing an example of setting information according to an exemplary embodiment of the present invention.

FIG. 16 is a diagram showing an example of difference setting information recording data according to an exemplary embodiment of the present invention.

FIG. 18 is a diagram showing an example of setting information according to an exemplary embodiment of the present invention.

FIG. 19 is a diagram showing an example of difference setting information recording data according to an exemplary embodiment of the present invention.

FIG. 21 is a diagram showing an example of setting information according to an exemplary embodiment of the present invention.

FIG. 23 is a diagram showing an example of difference setting information recording data according to an exemplary embodiment of the present invention.

FIG. 25 is a diagram showing an example of setting information according to an exemplary embodiment of the present invention.

FIG. 27 is a diagram showing an example of difference setting information recording data according to an exemplary embodiment of the present invention.

FIG. 29 is a diagram showing an example of setting information according to an exemplary embodiment of the present invention.

FIG. 31 is a diagram showing an example of setting information according to an exemplary embodiment of the present invention.

FIG. 33 is a diagram showing an example of difference setting information recording data after the device discarding process according to an exemplary embodiment of the present invention.

FIG. 34 is a flowchart showing an example device addition process according to an exemplary embodiment of the present invention.

FIG. 35 is a diagram showing an example of difference setting information recording data after the device addition process according to an exemplary embodiment of the present invention.

FIG. 38 is a diagram showing an example of alternative recording place definition data according to an exemplary embodiment of the present invention.

FIG. 41 is a diagram showing an example of condition corresponding recording place definition data according to an exemplary embodiment of the present invention.

FIG. 42 is a diagram showing an example of difference setting information recording data according to an exemplary embodiment of the present invention.

FIG. 43 is a flowchart showing an example flow of a setting information combining process according to an exemplary embodiment of the present invention.

DETAILED DESCRIPTION OF THE EMBODIMENTS

Exemplary embodiments, features, and aspects of the present invention will now herein be described in detail below with reference to the accompanying drawings.

Figure 1:
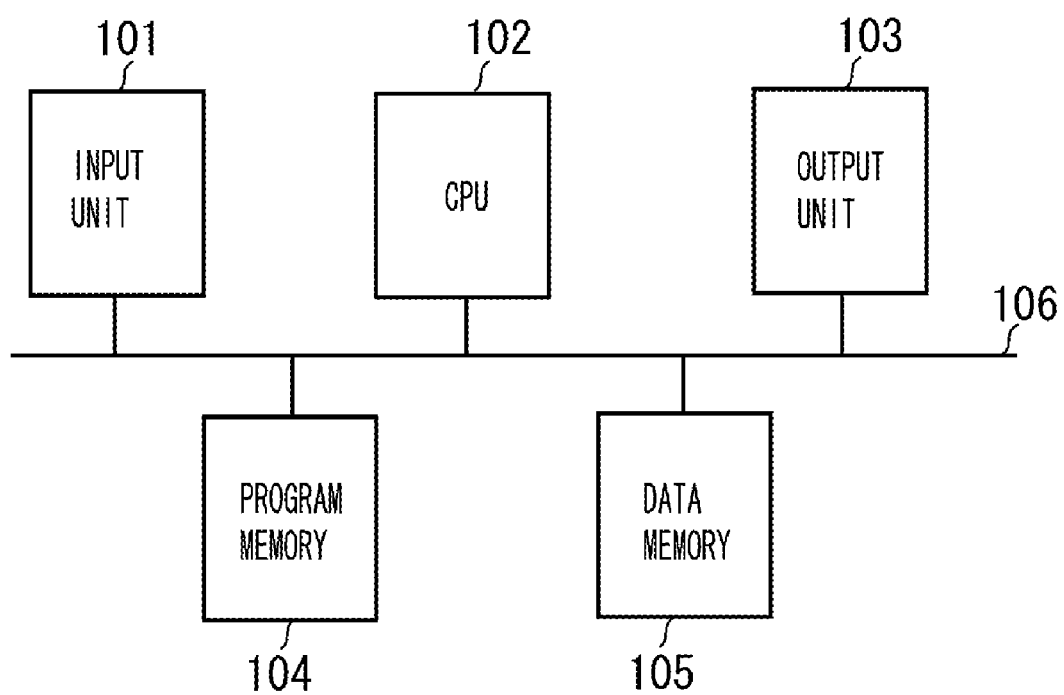
FIG. 1 is a diagram showing an example hardware configuration according an exemplary embodiment of the present invention.

FIG. 1 is a block diagram showing an example hardware configuration of a center server and each device according to an exemplary embodiment of the present invention. In FIG. 1, an input unit 101 is configured to input data. For the input unit 101, for example, an input screen constituted of a touch panel or the like, a remote controller, or an operation button may be provided to perform an input operation described below. A CPU 102 is configured to perform calculation, logical determination or the like for various processes, and to control components connected to a bus 106. An output unit 103 is configured to output data. For the output unit 103, a display such as an LCD or a CRT described below, or a recording such as a printer is available. A program memory 104 is configured to store control programs of the CPU 102 including a processing procedure of a flowchart described below. The program memory 104 can be a ROM. A data memory 105 is configured to store data generated by various processes. For example, the data memory 105 is a RAM to be loaded from a nonvolatile external storage medium before processing or referred to when necessary. A bus 106 is configured to transfer an address signal indicating each component to be controlled by the CPU 102, a control signal for controlling each component, and data transferred between the components.

First Exemplary Embodiment

Referring to FIGS. 2 to 17, a first exemplary embodiment of designating setting information under conditions designating a device place and using the setting information to realize a monitoring operation will be described. In particular, recording of the setting information in a storage place corresponding to the conditions, and operation of the device by combining difference information of the dispersed setting information will be described.

Figure 2:
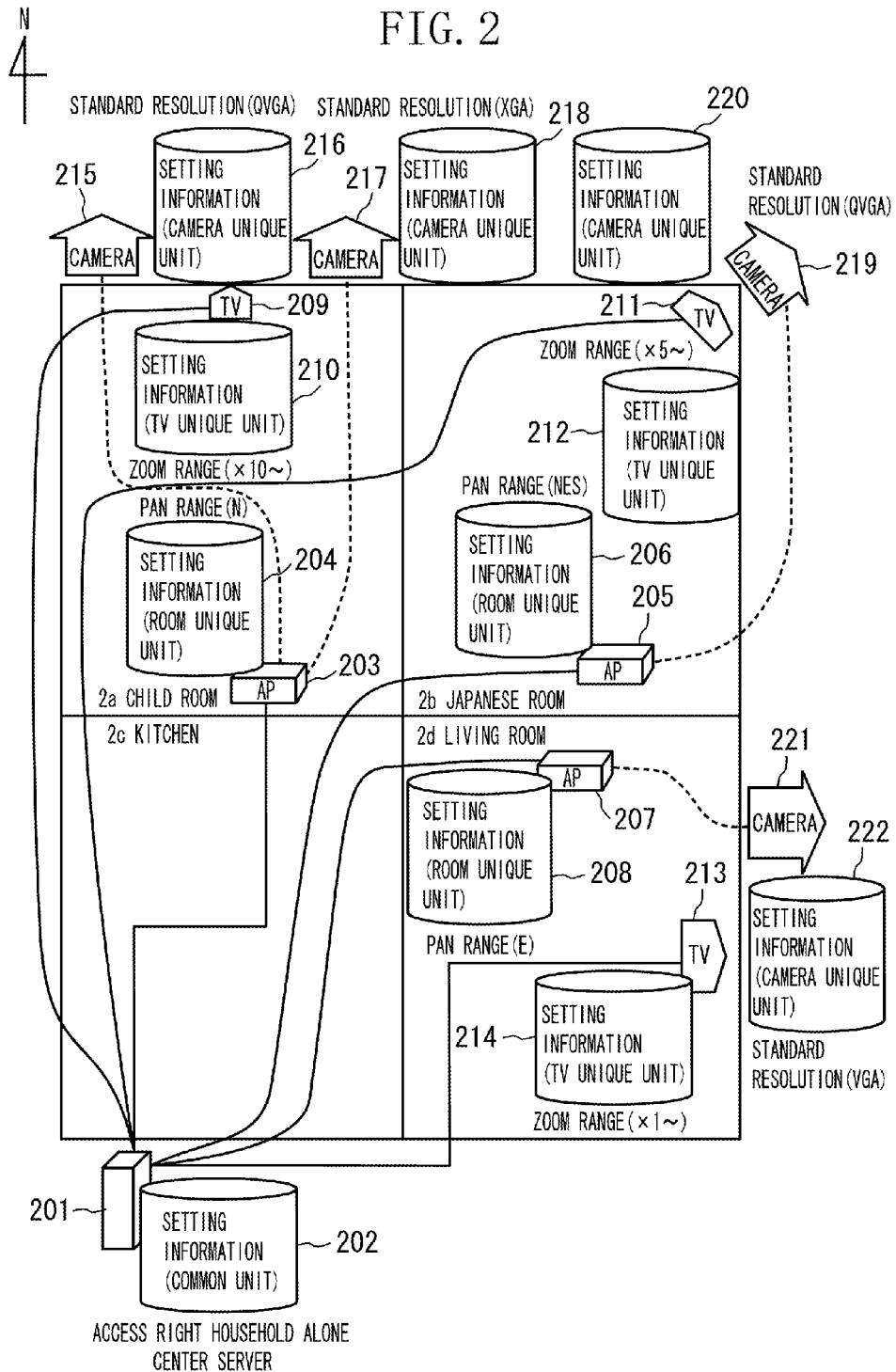
FIG. 2 is a diagram showing an example of a system configuration according to an exemplary embodiment of the present invention.

FIG. 2 shows an example of a system configuration according to the first embodiment. In the configuration of FIG. 2, a center server 201 and a plurality of devices constituting the hardware configuration of FIG. 1 are interconnected. The plurality of devices of the embodiment are a TV, a camera, and the like described below.

More specifically, the center server 201, access points 203, 205, and 207, and TVs 209, 211, and 213 as operation terminals are interconnected via a wired network. The access points 203, 205, and 207 and cameras 215, 217, 219, and 221, which are devices to be controlled, are interconnected via a wireless network. The devices include storage areas 202, 204, 206, 208, 210, 212, 214, 216, 218, 220, and 222 to hold setting information. For example, a monitoring video of the camera 217 is operated by the TV 213, which is connected to the wired network, via the access point 203 and the center server 201, which is connected to the wireless network. In this case, pieces of setting information stored in the storage areas of the devices are properly combined to operate the devices with optimal setting.

Figure 3:
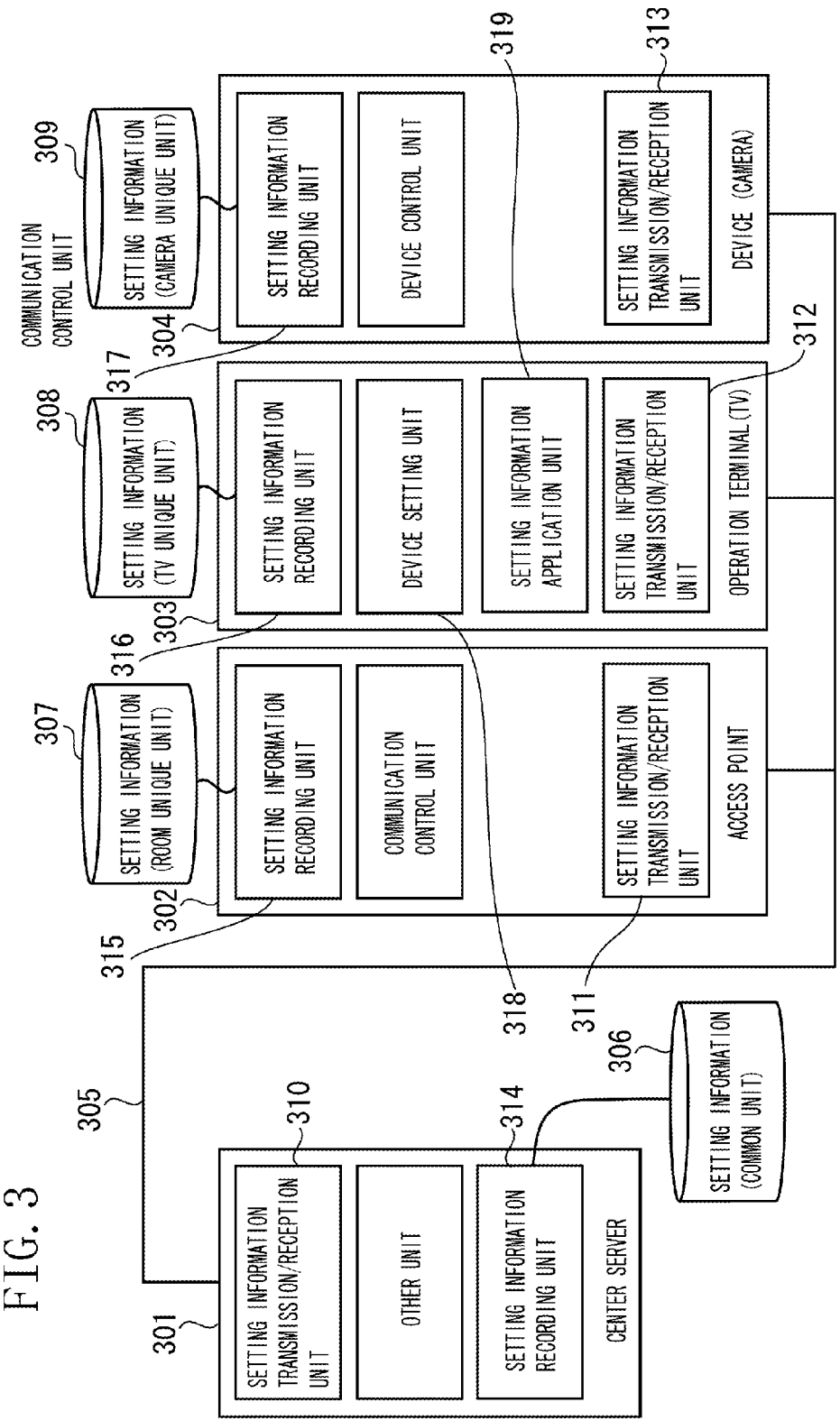
FIG. 3 is a system block diagram according to an exemplary embodiment of the present invention.

FIG. 3 is an exemplary system block diagram when the system configuration of FIG. 2 is realized according to the first embodiment. A center server 301 equivalent to the center server 201 of FIG. 2, an access point 302, an operation terminal 303 equivalent to the TV of FIG. 2, and a control target device 304 equivalent to the camera of FIG. 2 are interconnected via a wired/wireless network 305. The devices include storage areas 306, 307, 308, and 309 to hold setting information. The devices further include setting information transmission/reception units 310, 311, 312, and 313 to transmit/receive setting information, and setting information storage units 314, 315, 316, and 317 to store the setting information in the storage areas. The operation terminal 303 additionally includes a device setting unit 318 configured to execute device setting according to a user's instruction, and a setting information application unit 319 configured to apply corresponding setting information to the operation target device 304. The setting information is prepared by assuming that a common unit, a room unique unit, a TV unique unit, and a camera unique unit are respectively recorded in the storage area 306 of the center server 301, the storage area 307 of the access point 302, the storage area 310 of the operation terminal 303, and the storage area 309 of the control target device 304.

Figure 4:
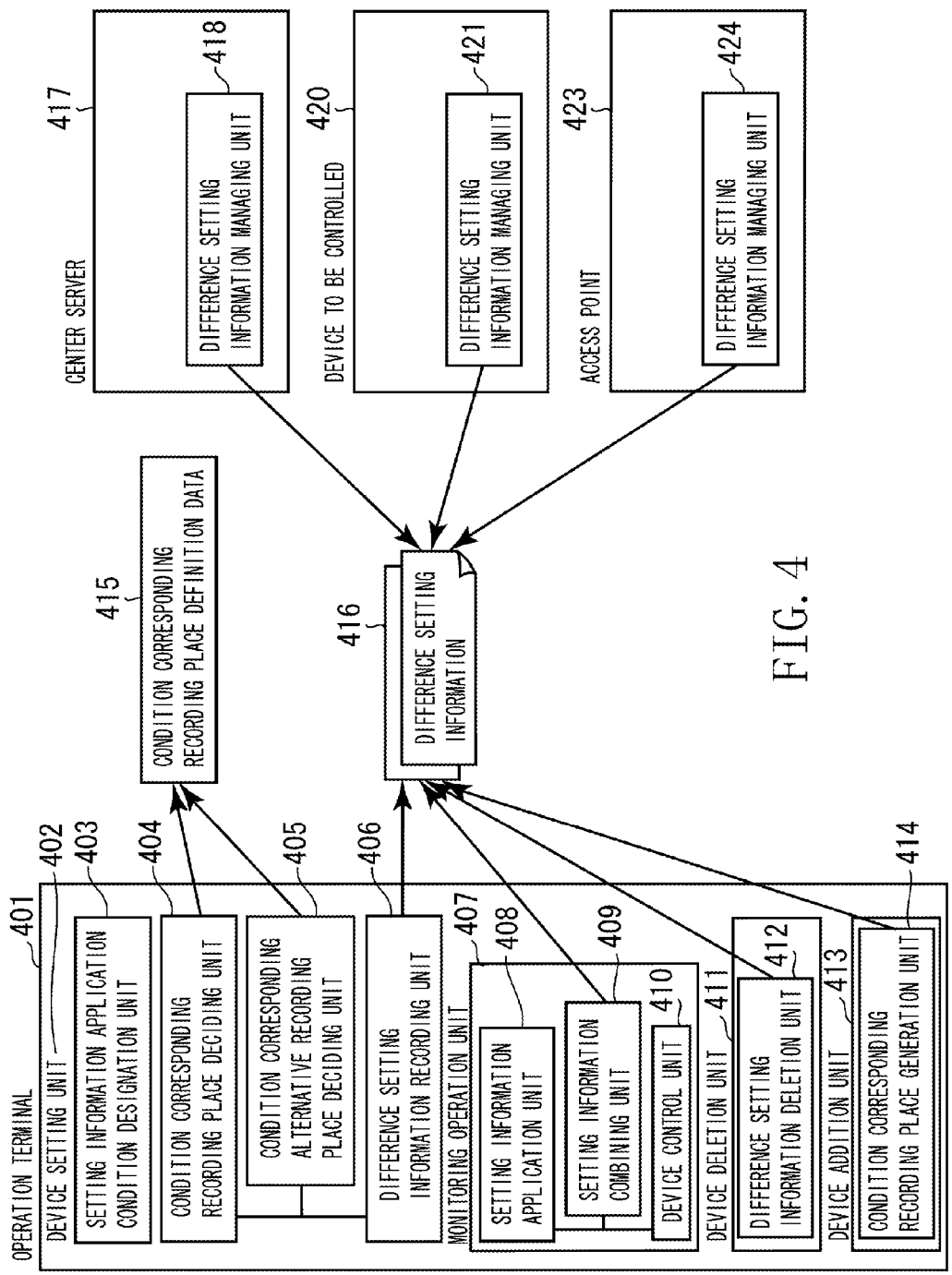
FIG. 4 is a functional block diagram according to an exemplary embodiment of the present invention.

FIG. 4 is an example functional block diagram of the embodiment. Each function is realized by a cooperative operation of a program stored in the program memory 104 and the CPU 102. The functions of FIG. 4 are not all essential according to embodiments described below, and functions other than those shown may be provided.

As shown in FIG. 4, the functional system of the exemplary embodiment includes an operation terminal 401 equivalent to the TV of FIG. 2, a center server 417, a control target device 420 equivalent to the camera of FIG. 2, and an access point 423. The operation terminal 401 includes a device setting unit 402, a monitoring operation unit 407, a device deletion unit 411, and a device addition unit 413. The device setting unit 402 includes a setting information application condition designation unit 403 to receive application conditions designated by a user's operation, and a condition corresponding recording place deciding unit 404 to decide a recording place of setting information by referring to condition corresponding recording place definition data 415. Further, the operation terminal 401 includes a condition corresponding alternative recording place deciding unit 405.

The device setting unit 402 additionally includes a difference setting information recording unit 406 to actually record difference setting information 416 in the recording place. The monitoring operation unit 407 includes a setting information combining unit 409 to combine difference setting information by referring to the difference setting information, and a setting information application unit 408 to apply the combined difference setting information. The monitoring operation unit 407 additionally includes a device control unit 410 to control the device according to the applied setting information and a user's operation. The device deletion unit 411 includes a difference setting information deletion unit 412. The device addition unit 413 includes a condition corresponding recording place generation unit 414. The center server 417, the control target device 420, and the access point 423 respectively include difference setting information managing units 418, 421, and 424 to store/manage difference setting information.

Referring to FIGS. 5 to 10, a case where the cameras 215 and 217, the TV 209, and the access point 203 in a child room 2a of FIG. 2 are set as application conditions of setting information is described below. A pan range of the camera installed in the child room 2a is limited to a north side (North).

As a result, difference setting information unique to a room is recorded in setting information of the storage area 204 of the access point 203.

Figure 5:
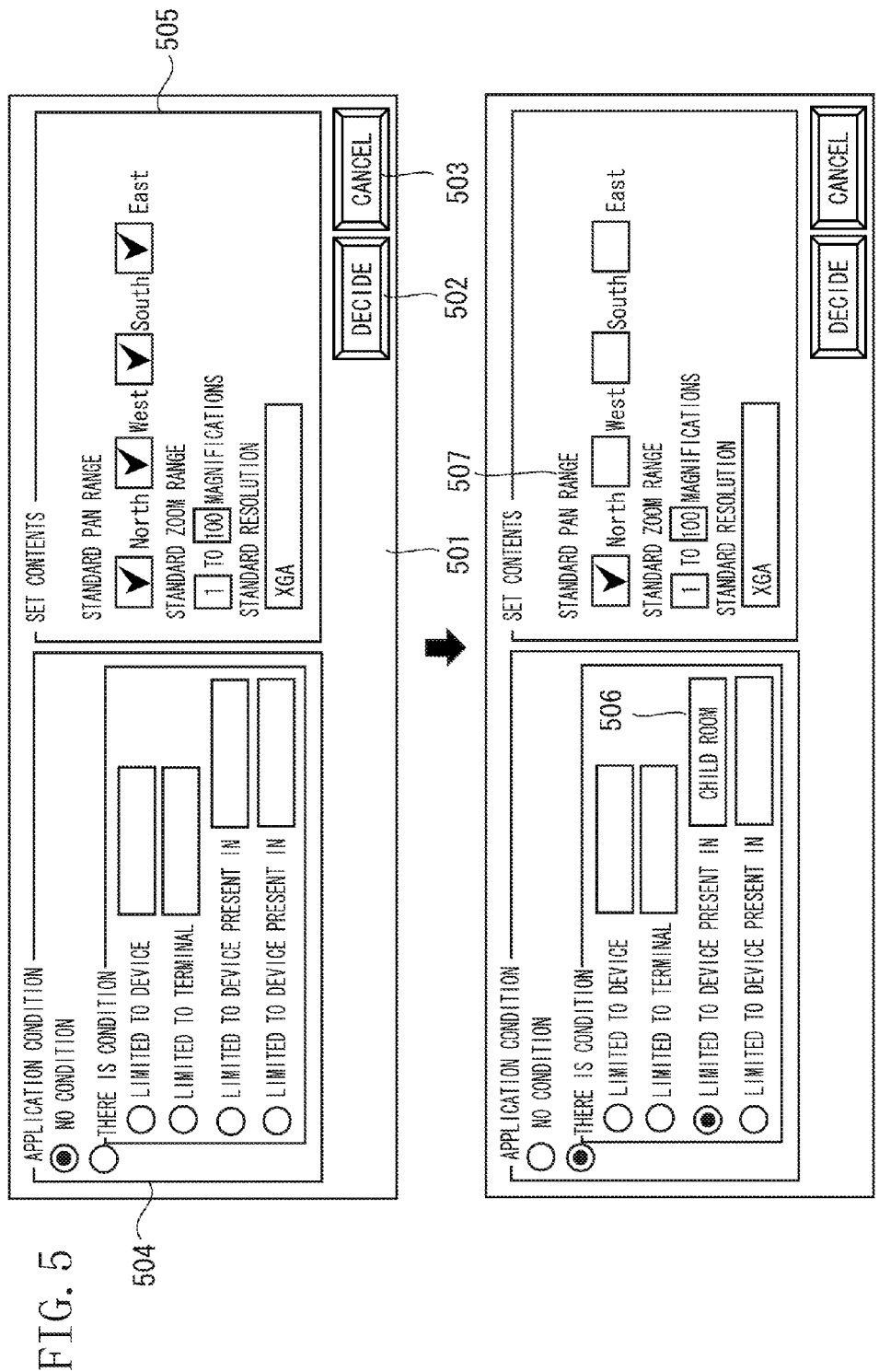
FIG. 5 is a diagram showing an example of a setting operation screen according to an exemplary embodiment of the present invention.

FIG. 5 shows an example of a screen for performing setting operations of the cameras 215 and 217 as operation target devices via an operation terminal of the TV 209 according to the first embodiment. A device setting operation screen 501 shown in FIG. 5 includes an application condition designation area 504, a setting content designation area 505, a decide button 502 for deciding designated contents, and a cancel button 503 for canceling the designated contents. A situation where a user designates "limited to device present in child room" 506 and changes a standard pan range only to "North" 507 is shown. Upon this setting, the decide button 502 is pressed to store setting contents corresponding to application conditions.

Figure 6:
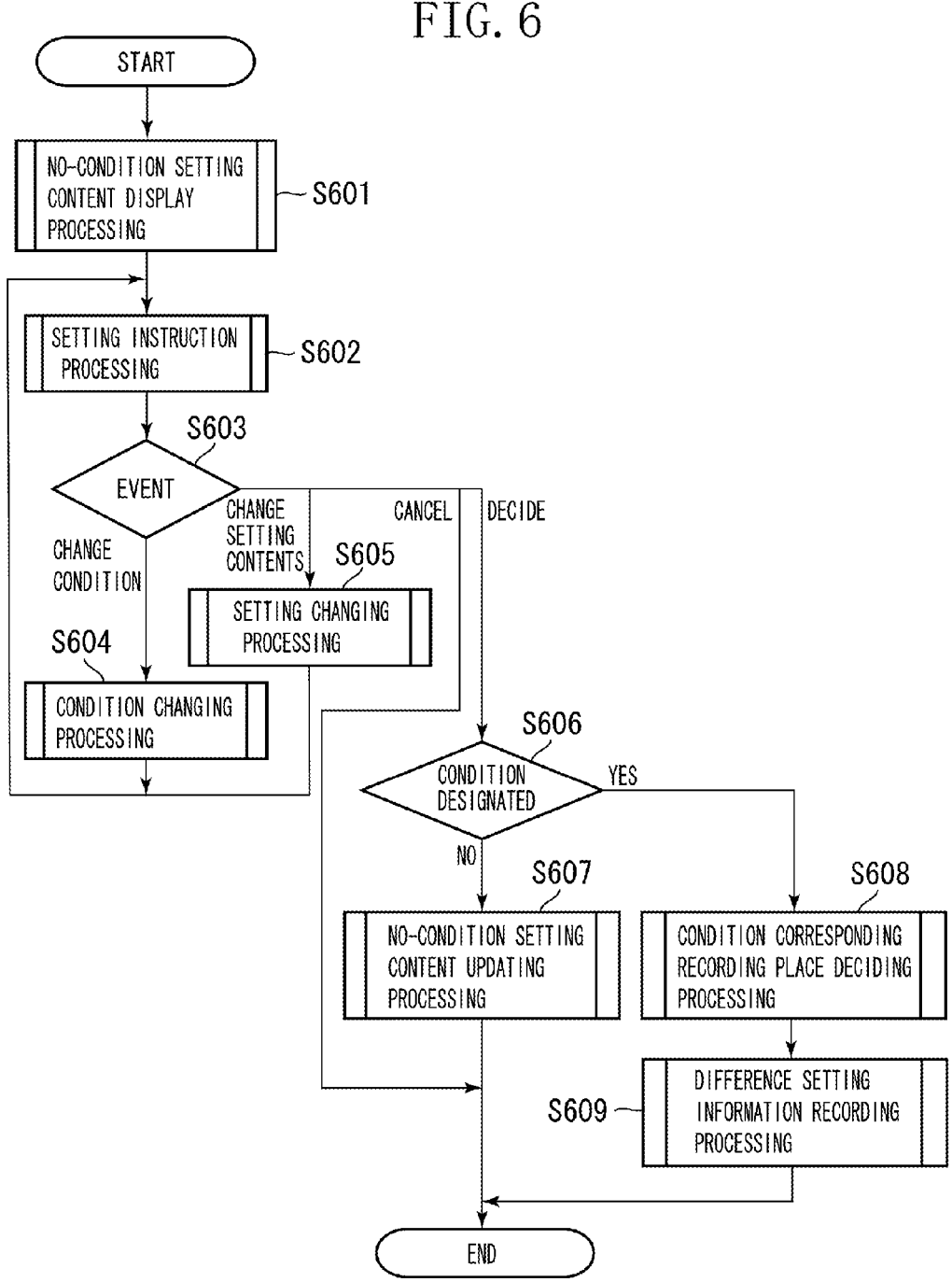
FIG. 6 is a flowchart showing an example flow of a device setting process according to an exemplary embodiment of the present invention.

FIG. 6 shows an exemplary flow of a device setting process of the device setting unit 402 of the first embodiment shown in FIG. 4. In a no-condition setting content display process of step S601 of FIG. 6, "setting contents of application condition=no condition" shown in FIG. 5 is displayed, and a process of step S602 and subsequent steps is repeated. In a setting instruction process of step S602, a user's instruction generated via the device setting operation screen is received, and the process proceeds to step S603. If a changing operation of the application conditions is determined in step S603, application conditions of the setting information are changed by a condition changing process of step S604, and the process then returns to step S602 to repeat the processing. If a changing operation of the setting contents corresponding to the application conditions is determined in step S603, the setting contents are changed by a setting changing process of step S605, and then the process returns to step S602 to repeat the processing. If a cancel operation of the designated contents is determined in step S603, the process ends. If a decide operation is determined, the process proceeds to step S606.

In step S606, if it is determined in step S606 that application conditions of the setting contents have not been designated, common setting contents are updated to be stored in the center server 201 by a no-condition setting content updating process of step S607, and the process ends. On the other hand, if it is determined in step S606 that application conditions of the setting contents have been designated, in a condition corresponding recording place deciding process of step S608, a recording place corresponding to the designated conditions is decided by referring to condition corresponding recording place definition data described below. Then, in a difference setting information recording process of step S609, difference setting information is stored in the recording place, and the process ends.

FIG. 7 shows an example of the condition corresponding recording place definition data 415 of FIG. 4. In the condition corresponding recording place definition data of FIG. 7, conditions when setting information is applied, and corresponding recording places of difference setting information are recorded as indicated by 701 to 705. For example, in the condition corresponding recording place definition data 704, a recording place "storage area of corresponding access point" is set corresponding to a condition "limit place of device". Specifically, if "child room 2a" shown in FIG. 2 is designated as a condition "limit place pf device", a storage area 204 of the corresponding access point 203 is decided as the recording place.

Figure 8:
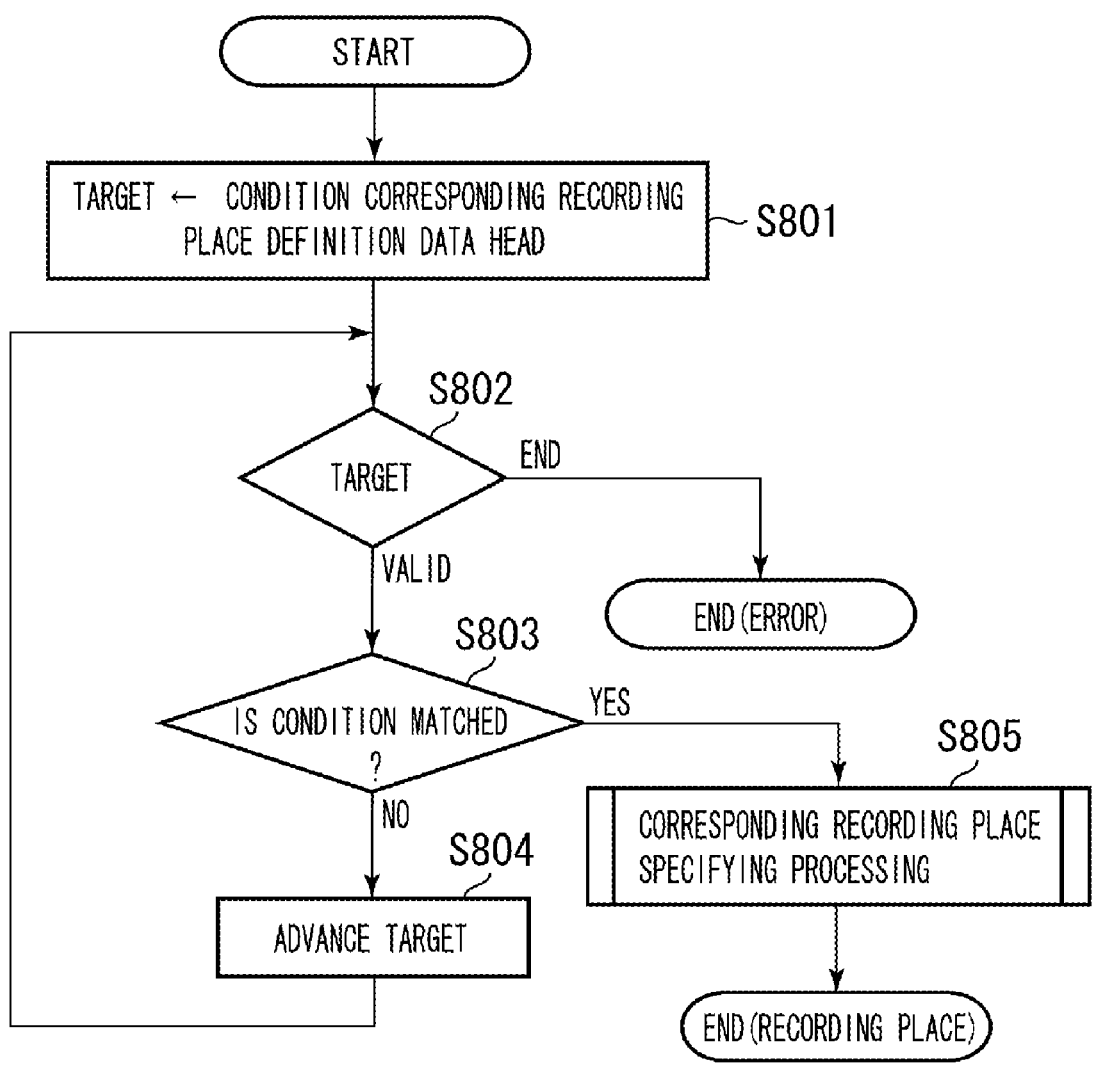
FIG. 8 is a flowchart showing a flow of a condition corresponding recording place deciding process according to an exemplary embodiment of the present invention.

FIG. 8 shows an example flow of a condition corresponding recording place deciding process of the condition corresponding recording place deciding unit 404 of the first embodiment shown in FIG. 4. A target is initialized at a head of condition corresponding recording place definition data in step S801 of FIG. 8, and a process of step S802 and subsequent steps is repeated. If the target is determined to be valid in step S802, the process proceeds to step S803. If an end is determined in step S802, an error is determined to end the process. If the designated application conditions match the condition corresponding recording place definition data of the target in step S803 (YES in step S803), in a corresponding recording place specifying process of step S805, a recording place is specified according to the condition corresponding recording place definition data of the target. Then, the process ends. For example, if "child room 2a" of FIG. 2 is designated as a condition "limit place of device", the storage area 204 of the corresponding access point 203 is decided as the recording place. On the other hand, if matching of the conditions is not determined in step S803 (NO in step S803), the target is advanced in step S804, and the process then returns to step S802 to repeat the processing.

FIG. 9 shows an example of difference setting information recording data according to the first embodiment. In the difference setting information recording data of FIG. 9, setting items and corresponding setting contents are recorded. For example, in the center server 201, which serves as a common unit of the setting information, setting items of a standard pan range "North, West, South, and East" 901, a standard zoom range 902, and a standard resolution 903 of difference setting information recording data are set. In the access point 203 in the child room 2a, a standard pan range "North" 904 alone of difference setting information recording data corresponding to a difference from the center server 201 is set. By referring to the difference setting information recording data, when a device in the child room 2a is operated, the difference setting information "North" of the access point 203 becomes valid only in the case of the standard pan range, while difference setting information of the center server 201 as the common unit becomes valid for other cases.

Figure 10:
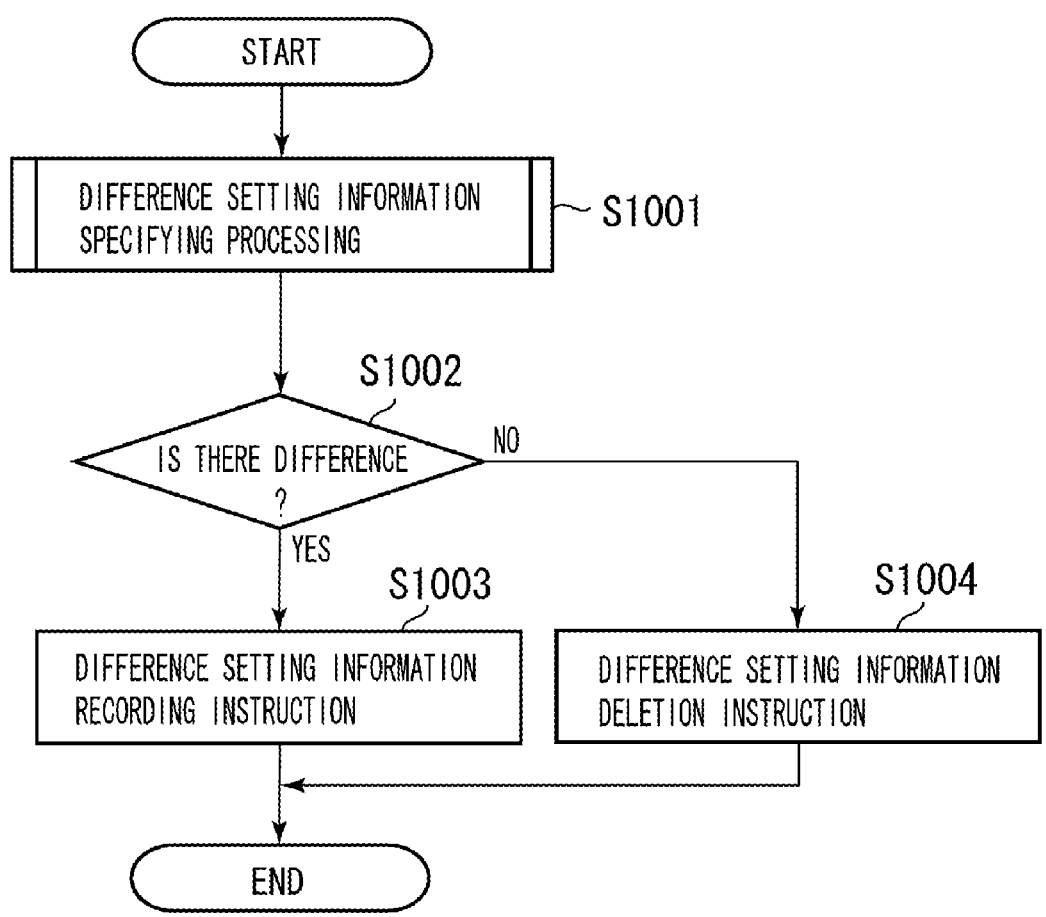
FIG. 10 is a flowchart showing an example difference setting information recording process according to an exemplary embodiment of the present invention.

FIG. 10 shows an example flow of a difference setting information recording process of the difference setting information recording unit 406 of the first embodiment shown in FIG. 4. In a difference setting information specifying process of step S1001 of FIG. 10, a difference from setting information when there is no condition is specified, and the process proceeds to step S1002. Here, if it is determined in step S1002 that there is a difference (YES in step S1002), recoding of the difference setting information is instructed to the information processing apparatus in step S1003. Then, the process ends. If it is determined in step S1002 that there is no difference (NO in step S1002), deletion of the difference setting information is instructed to the information processing apparatus in step S1004. Then, the process ends.

Next, a case where the camera 217 installed in the child room 2a having the access point 203 is operated via the TV 213 present in the living room 2d will be described. In this case, in addition to the setting information 202, when there is no condition, recorded in the center server 201, there is only a pan range "North" of the difference setting information 204 of the access point 203 recorded in the operation described above with reference to FIGS. 5 to 10.

Figure 11:
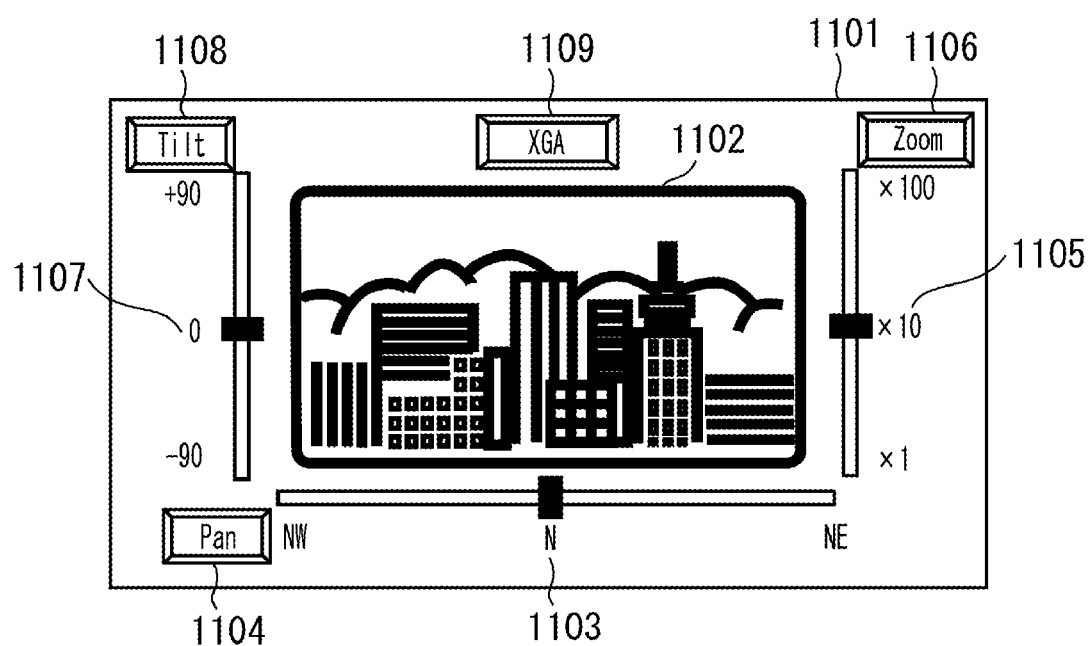
FIG. 11 is a diagram showing an example situation of a monitoring operation according to an exemplary embodiment of the present invention.

FIG. 11 shows an example of a situation for performing a monitoring operation on the camera 304 via the TV 303 of FIG. 3. A monitoring operation screen 1101 of FIG. 11 includes a photographic video display area 1102 of the camera 304 and various operation areas. Specifically, the monitoring operation screen 1101 includes a pan operation slide bar 1103, a zoom operation slide bar 1105, and a tilt operation slide bar 1107. By operating the slide bars, the camera 304 can be controlled, and the photographic video display area 1102 can be operated. The monitoring operation screen 1101 further includes a pan range changing button 1104, a zoom range changing button 1106, a tilt range changing button 1108, and a resolution changing button 1109. These buttons are used to temporarily change a standard pan range, a zoom range, and the like designated by the setting operations on the monitoring operation screen 1101.

FIG. 12 shows an example of setting information combined when the camera 217 is operated via the TV 213 according to the first embodiment. As indicated by 1201 to 1203 of FIG. 12, only in the case of the standard pan range, the difference setting information "North" recorded on the access point 203 is valid, while the setting information when there is no condition is valid for other items.

Figure 13:
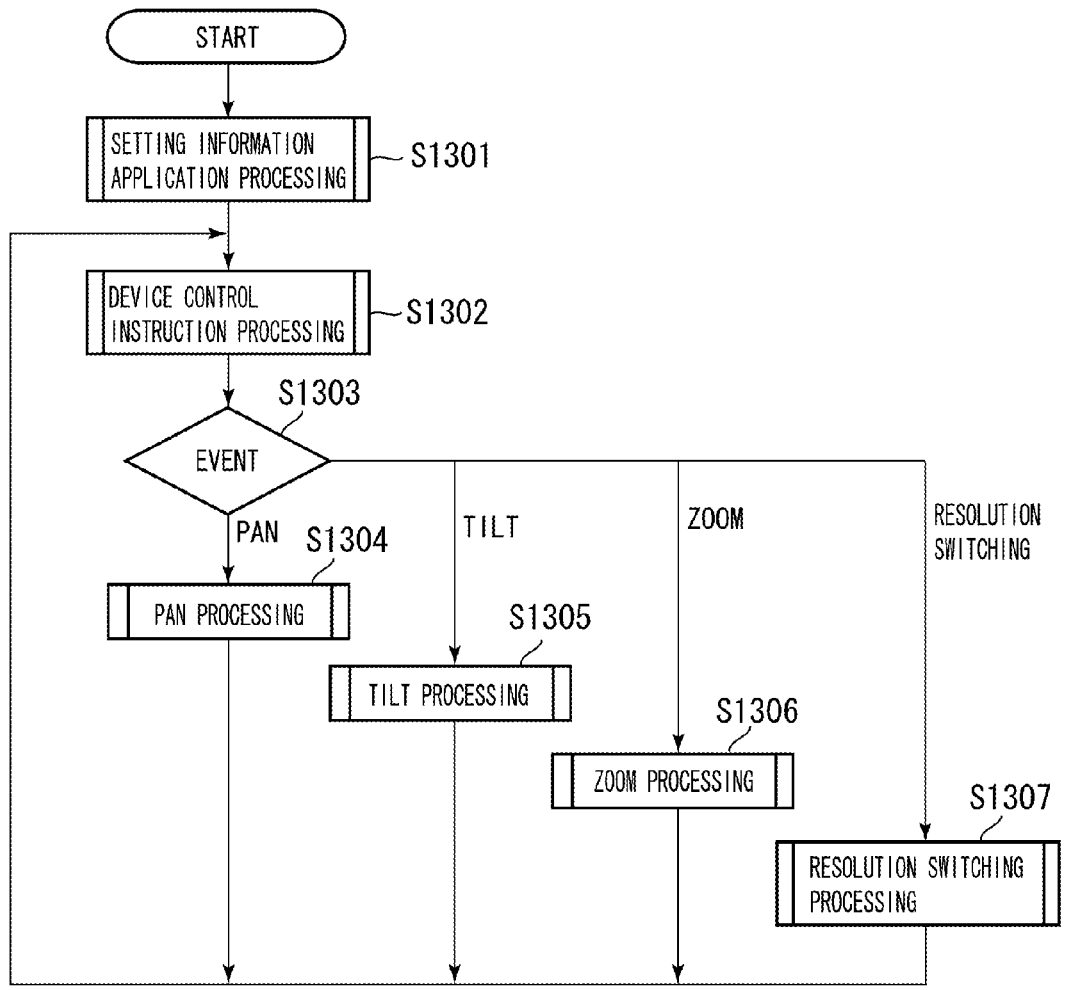
FIG. 13 is a flowchart showing an example monitoring operation process according to an exemplary embodiment of the present invention.

FIG. 13 shows an example flow of a monitoring operation process of the monitoring operation unit 407 of FIG. 4. In a setting information application process of step S1301 of FIG. 13, setting information combining an operation target device, an operation terminal and corresponding difference setting information together is applied to display an operation screen. In step S1302, a user's operation is received in a device control instruction process. Then, in step S1303, the type of processing affiliated with the event is determined. If a pan operation is determined in step S1303, the camera 217 is subjected to pan control in a pan process of step S1304, and the process returns to step S1302 to repeat the processing. If a tilt operation is determined in step S1303, the camera 217 is subjected to tilt control in a tilt process of step S1305, and the process returns to step S1302 to repeat the processing. If a zoom operation is determined in step S1303, the camera 217 is subjected to zoom control in a zoom process of step S1306, and the process returns to step S1302 to repeat the processing. If a resolution switching operation is determined in step S1303, the camera 217 is subjected to resolution switching control in a resolution switching process of step S1307, and the process returns to step S1302 to repeat the processing.

Figure 14:
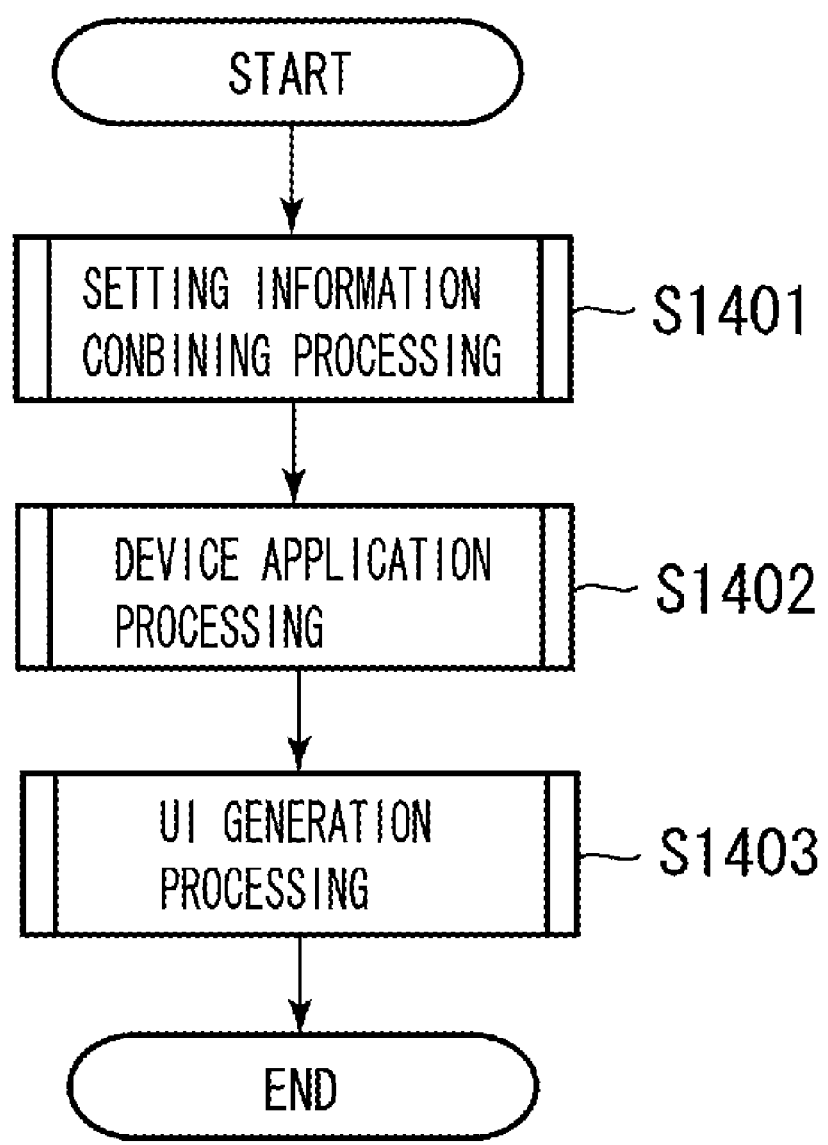
FIG. 14 is a flowchart showing an example setting information application process according to an exemplary embodiment of the present invention.

FIG. 14 shows an example flow of a setting information application process of the setting information application unit 408 of FIG. 4. In a setting information combining process of step S1401 of FIG. 14, the operation target device, the operation terminal, and the corresponding difference setting information are combined to generate setting information. The setting information is applied to the operation target device in a device application process of step S1402. Then, an operation screen is displayed in a user interface (UI) generation process of step S1403 to display the operation screen, and the process ends.

Figure 15:
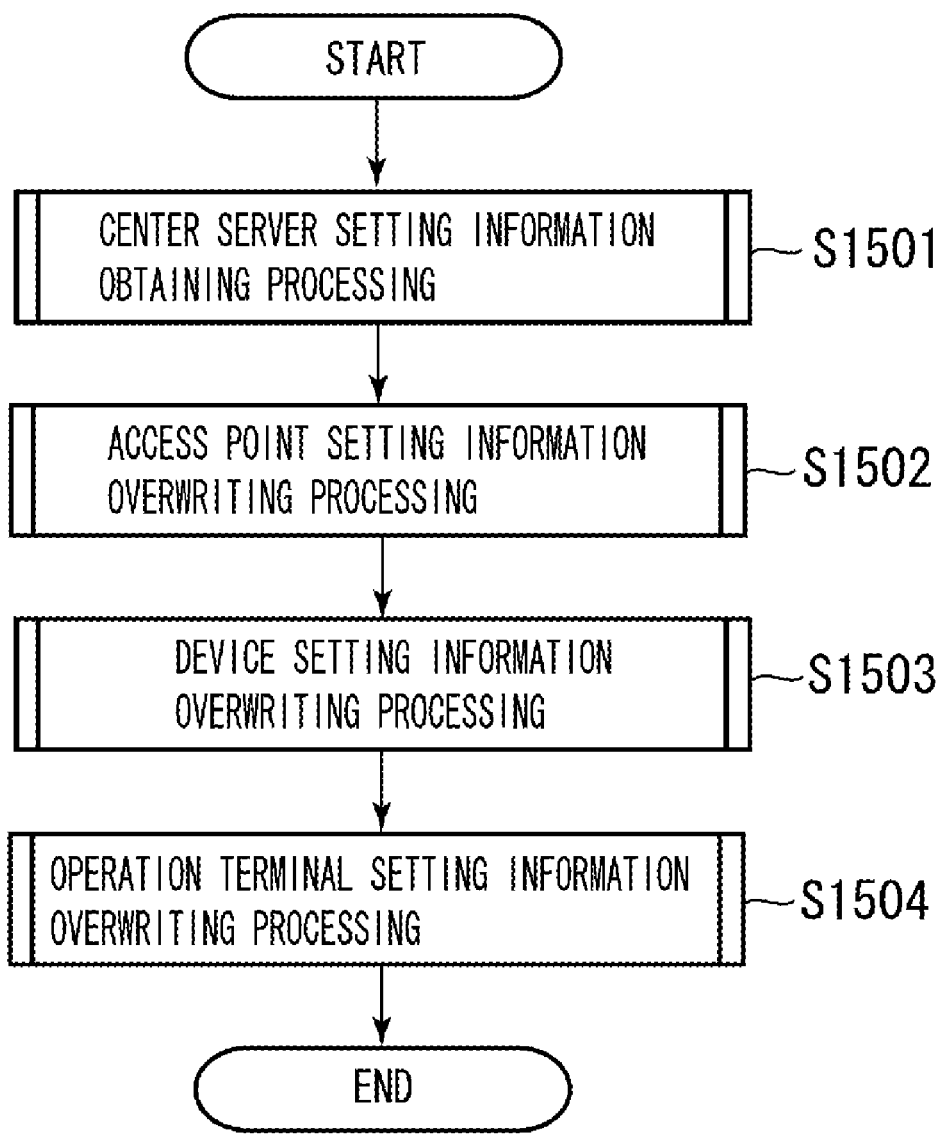
FIG. 15 is a flowchart showing an example setting information combining process according to an exemplary embodiment of the present invention.

FIG. 15 shows an example flow of a setting information combining process of the setting information combining unit 409 of FIG. 4. In a center server setting information obtaining process of step S1501 of FIG. 15, a common unit of setting information when there is no condition is obtained. In an access point setting information overwriting process of step S1502, the setting information is overwritten with difference setting information corresponding to a place of the operation target device stored in the access point and difference setting information corresponding to a place of the operation terminal. The setting information is overwritten with the difference setting information of the operation target device by a device setting information overwriting process of step S1503, and the setting information is overwritten with the difference setting information of the operation terminal in an operation terminal setting information overwriting process of step S1504. Then, the process ends.

The case where a single application condition is designated for the contents has been described. However, the contents are valid when a plurality of conditions are combined. In this case, a recording place corresponding to a combination of conditions is determined, and difference setting information is stored in the recording place.

The case where the network camera is a target for the contents has been described. However, the contents are valid when a network printer is a target. For example, in the case of a network printer, printing is directly executed when it is in the same place as that of an operator. In another place, printing may be executed after an authentication operation on the printer. Thus, setting information corresponding to a place management storage place such as an access point may be stored.

As described above, according to an exemplary embodiment of the invention, by dispersing and saving the differences of setting information in the storage places corresponding to the conditions (device, installation place, device operation, and the like), it is possible to prevent an increase in necessary storage capacity caused by concentration of setting information in a specific device. The device can be used in an optimal state by properly using the setting information corresponding to the conditions. Proper use of the setting information is facilitated. The setting information can be shared by a plurality of operation terminals.

Second Exemplary Embodiment

Referring to FIG. 2 and FIGS. 16 to 18, a second embodiment will be described in which a difference information combination of dispersed setting information is changed by targeting a device different from that of the first embodiment.

The second embodiment will be described by way of example where the camera 215 present in the child room 2a having the access point 203 is operated via the TV 213 in the living room 2d according to a monitoring operation described below. According to the second embodiment, there is a common unit 202 of difference setting information, when there is no condition, recorded in the center server 201. Additionally, the pan range "North" of the difference setting information 204 of the access point 203 recorded in the operation described above with reference to FIGS. 5 to 10, and a standard resolution "QVGA" of the difference setting information 216 of the camera 215 are present.

FIG. 16 shows an example of difference setting information recording data according to the second embodiment. In FIG. 16, in addition to contents similar to that of FIG. 9 (reference numerals 1601-1604), a standard resolution "QVGA" of difference setting information recording data 1605 of the camera 215 is set. By referring to the above-described difference setting information recording data, difference setting information "QVGA" of the camera 215, which is an operation target device, becomes valid for the standard resolution, and difference setting information "North" of the access point 203 becomes valid for the standard pan range. For other items, difference setting information of the common center server 201 becomes valid.

Figure 17:
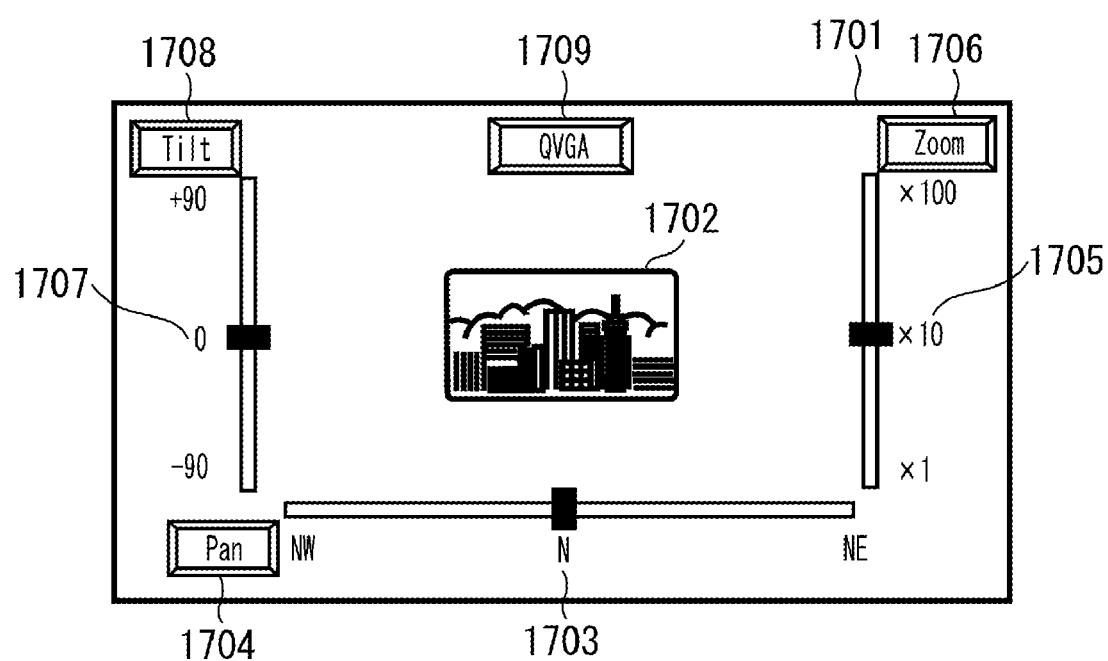
FIG. 17 is a diagram showing an example of showing a situation of a monitoring operation according to an exemplary embodiment of the present invention.

FIG. 17 shows an example of a situation where the camera 304 of FIG. 3 is subjected to a monitoring operation via the TV 303 according to the second embodiment. For components 1701 to 1709, as compared with the monitoring operation screen of FIG. 11, only a photographic video display area 1702 for the camera 304 is different in that it is set to QVGA. This is because the difference setting information recording data 1605 of FIG. 16 is reflected.

FIG. 18 shows an example of setting information combined when the camera 215 is operated via the TV 213 according to the second embodiment. As indicated by 1801 to 1803 of FIG. 18, "QVGA" of difference setting information recorded on the camera 215 becomes valid in the case of a standard resolution. In the case of a standard pan range, "North" of difference setting information recorded on the access point 203 becomes valid. For other items, setting information when there is no condition becomes valid.

As described above, recording, on a device, a difference of the setting information limited to the device facilitates proper use of the setting information designating the device.

Third Exemplary Embodiment

Referring to FIG. 2 and FIGS. 19 to 21, a third embodiment will be described in which a difference information combination of dispersed setting information is changed by using an operation terminal different from that of the first embodiment. The third embodiment shows a situation where the camera 217 present in the child room 2a having the access point 203 is operated via the TV 211 in the Japanese room 2b. In addition to the setting information 202 of no condition recorded in the center server 201 shown in FIG. 2, according to the third embodiment, a pan range "North" of the difference setting information 204 of the access point 203 recorded in the operation described above with reference to FIGS. 5 to 10 is present. Additionally, a standard zoom range "5 to 100 magnifications" of difference setting information 212 of the TV 211 is present.

FIG. 19 shows an example of difference setting information recording data according to the third embodiment. In 1901 to 1905 of FIG. 19, in addition to the contents of FIG. 9, a standard zoom range "5 to 100 magnifications" of difference setting information recording data 1905 of the TV 211 is set.

By referring to the above-described difference setting information recording data, difference setting information "5 to 100 magnifications" of the TV 211, which is an operation target device, becomes valid for the standard zoom range, and difference setting information "North" of the access point 203 becomes valid for the standard pan range. For other items, difference setting information of the common center server 201 becomes valid.

Figure 20:
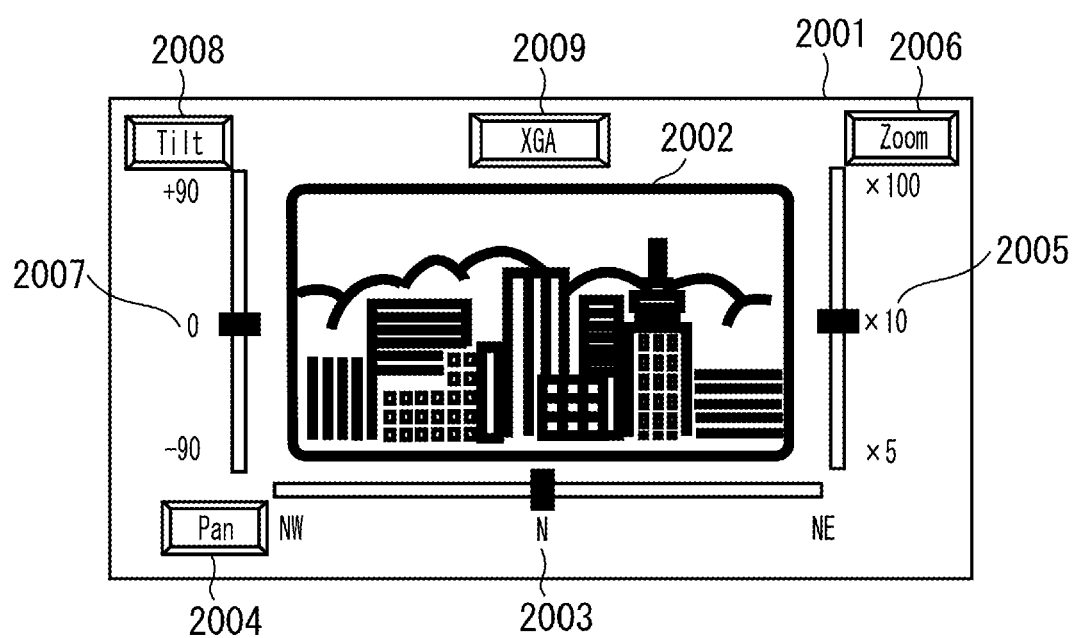
FIG. 20 is a diagram showing an example of a situation of a monitoring operation using a remote camera according to an exemplary embodiment of the present invention.

FIG. 20 shows an example of a situation where a remote camera performs a monitoring operation according to the third embodiment. For components 2001 to 2009, as compared with the monitoring operation screen of FIG. 11, a zoom range 2005 is only different in that it is set to 5 to 100 magnifications. This is because the difference setting information recording data 1905 of FIG. 19 is reflected.

FIG. 21 shows an example of setting information combined when the camera 217 is operated via the TV 211 according to the third embodiment. As indicated by 2101 to 2103 of FIG. 21, "5 to 100 magnifications" of difference setting information recorded on the TV 211 becomes valid in the case of the standard zoom range. In the case of the standard pan range, "North" of difference setting information recorded on the access point 223 becomes valid. For other items, setting information when there is no condition becomes valid.

As described above, recording, on an operation terminal, a difference of the setting information limited to the operation terminal facilitates proper use of the setting information limiting the operation terminal.

Fourth Exemplary Embodiment

Referring to FIGS. 22 to 25, a fourth embodiment will be described in which a difference information combination of dispersed setting information is changed by moving a device to a place different from that of the first embodiment.

Figure 22:
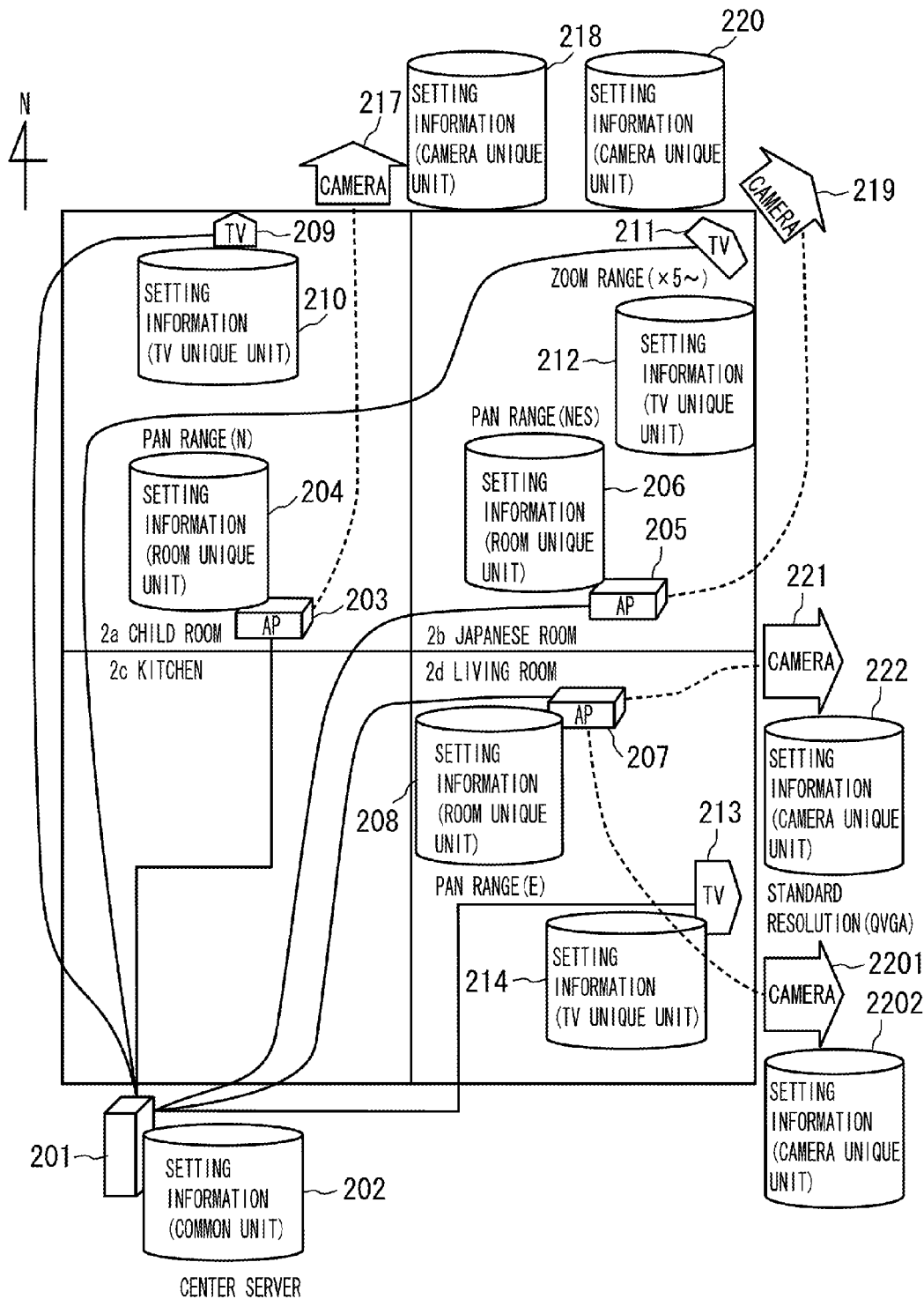
FIG. 22 is a diagram showing an example of a system configuration according to an exemplary embodiment of the present invention.

FIG. 22 shows an example of a system configuration according to the fourth embodiment, specifically showing a monitoring operation target described below with reference to FIGS. 23 to 25. Components similar to those of FIG. 2 are denoted by similar reference numerals. Specifically, a situation is shown where in a monitoring operation described below, a camera 2201, which corresponds to the camera 215 installed in the child room 2a in FIG. 2, is moved to the living room 2d having the access point 207, and is operated via the TV 211 in the Japanese room 2b. In FIG. 22, in addition to the setting information 202 of no condition recorded in the center server 201, a pan range "East" of the difference setting information 208 of the access point 207, and a standard zoom range "5 to 100 magnifications" of difference setting information 212 of the TV 211 are present. A standard resolution "QVGA" of difference setting information 2202 of the camera 2201 is also present.

FIG. 23 shows an example of difference setting information data according to the fourth embodiment. In FIG. 23, in addition to contents similar to that of FIG. 9 (reference numerals 2301-2303), data 2304 indicates a difference setting information recording data standard pan range "East" of the access point 207 set in the living room 2d. Data 2305 indicates a standard zoom range "5 to 100 magnifications" of difference setting information recording data of the TV 211. Data 2306 indicates a standard resolution "QVGA" of the difference setting information recording data 2202 of the camera 2201.

By referring to the above-described difference setting information recording data, difference setting information "5 to 100 magnifications" of the TV 211, which is an operation target device, becomes valid for the standard zoom range. Difference setting information "East" of the access point 207 becomes valid for the standard pan range. For the standard resolution, difference setting information "QVGA" of the camera 2201 becomes valid. For other items, difference setting information of the common center server 201 becomes valid.

Figure 24:
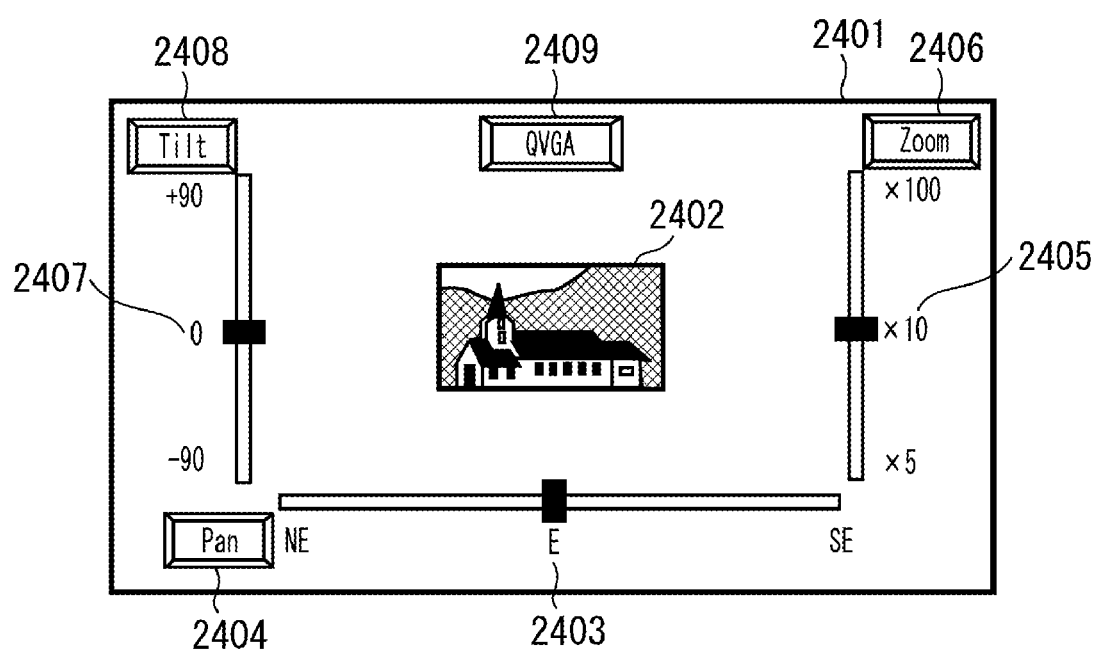
FIG. 24 is a diagram showing an example of a situation of a monitoring operation according to an exemplary embodiment of the present invention.

FIG. 24 shows an example of a situation where the camera 304 of FIG. 3 is subjected to a monitoring operation via the TV 303. A difference from the monitoring operation screen of FIG. 11 is that a standard pan range 2403 is set to a range near "East", a zoom range 2405 is set to 5 to 100 magnifications, and a photographic video display area 2402 of the camera 304 is set to QVGA. This is because the difference setting information recording data 2304, 2305 and 2306 of FIG. 23 are reflected.

FIG. 25 shows an example of setting information combined when the camera 2201 is operated via the TV 211 according to the fourth embodiment. As shown in FIG. 25, "5 to 100 magnifications" of difference setting information 2502 recorded on the TV 211 becomes valid in the case of the standard zoom range. In the case of the standard pan range, "East" of difference setting information 2501 recorded on the access point 207 becomes valid. "QVGA" of difference setting information 2503 recorded on the camera 2201 becomes valid in the case of the standard resolution. For other items, setting information when there is no condition becomes valid.

As described above, recording, on an access point, a difference of the setting information limited to a place facilitates proper use of the setting information designating the place. In particular, recording, on an access point, a difference of the setting information limited to the device place facilitates proper use the setting information designating the device place.

Fifth Exemplary Embodiment

Referring to FIGS. 26 to 31, a fifth embodiment will be described in which a difference information combination of dispersed setting information is changed by using an operation terminal in a place different from that of the first embodiment. In particular, a change depending on presence in the same place as that of a target device will be described. Furthermore, specifying a place of the operation terminal based on wireless connection of an access point and the operation terminal will be described.

Figure 26:
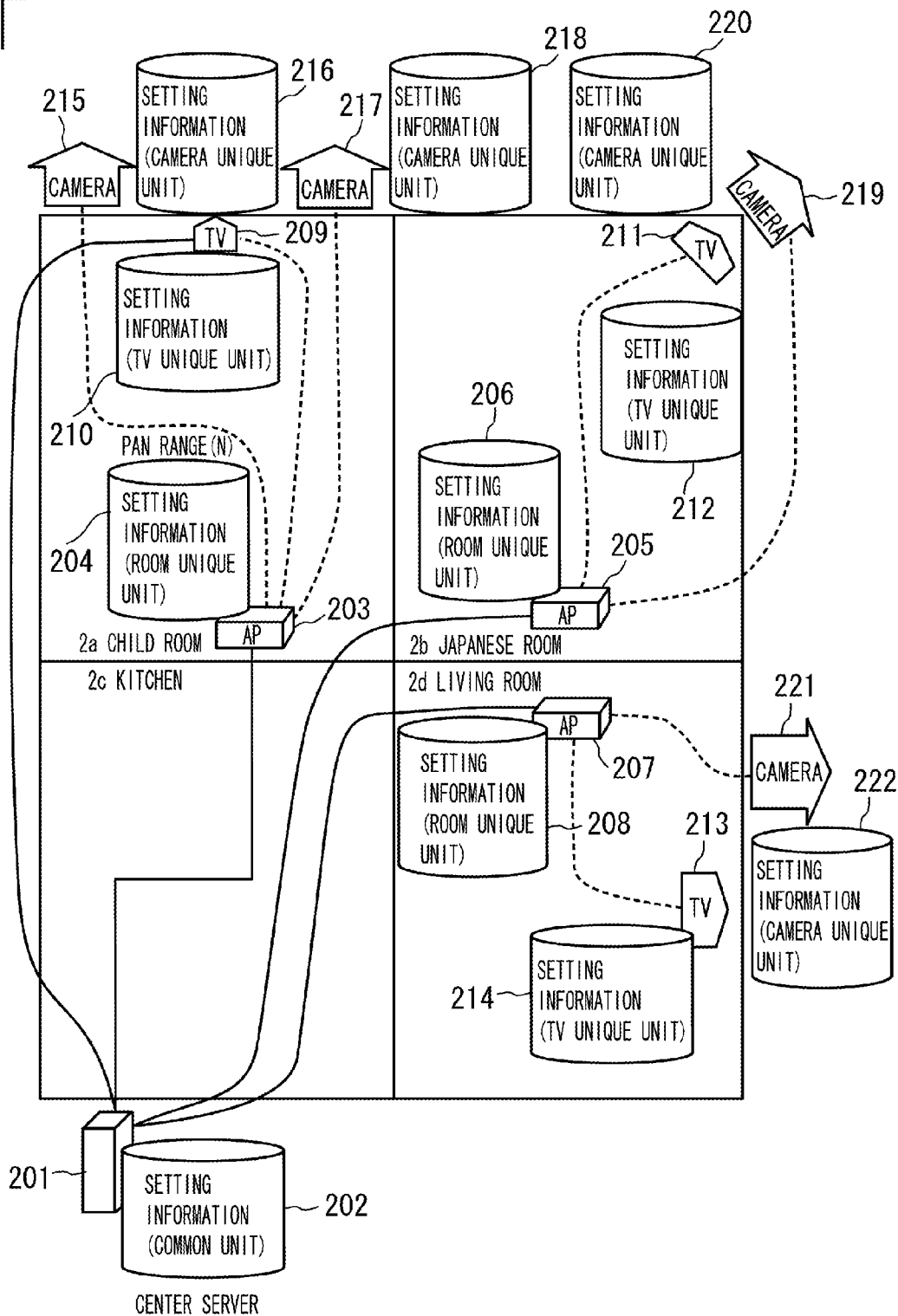
FIG. 26 is a diagram showing an example of a system configuration according to an exemplary embodiment of the present invention.

FIG. 26 shows an example of a system configuration of the fifth embodiment, specifically showing a monitoring operation target described below with reference to FIGS. 27 to 29. Components similar to those of FIG. 2 are denoted by similar reference numerals. Specifically, a situation is shown where the camera 217 present in the child room 2a having the access point 203 is operated via the TV 213 in the living room 2d having the access point 207 in a monitoring operation described below. In FIG. 26, in addition to the setting information of no condition recorded in the center server 201, there is only a pan range "North" of the difference setting information 204 corresponding to a place of an operation terminal of the access point 203.

FIG. 27 shows an example of difference setting information data according to the fifth embodiment. In data 2701 to 2704 of FIG. 27, unlike FIG. 9, a standard pan range is correlated with the place of the operation terminal to be set as difference setting information recording data 2704 of the access point 203. By referring to the above-described difference setting information recording data, difference setting information "North" correlated with the place of the operation terminal of the access point 203 becomes valid for the standard pan range. For other items, difference setting information of the common center server 201 becomes valid. Thus, by recording the difference setting information correlated with the place of the operation terminal, an operation method corresponding to the operator's place is enabled. For example, photographing in the room is unnecessary when the operator is in the same room as that of the camera, and operability is improved only by setting a pan range outside even for a camera capable of all-direction photographing.

Figure 28:
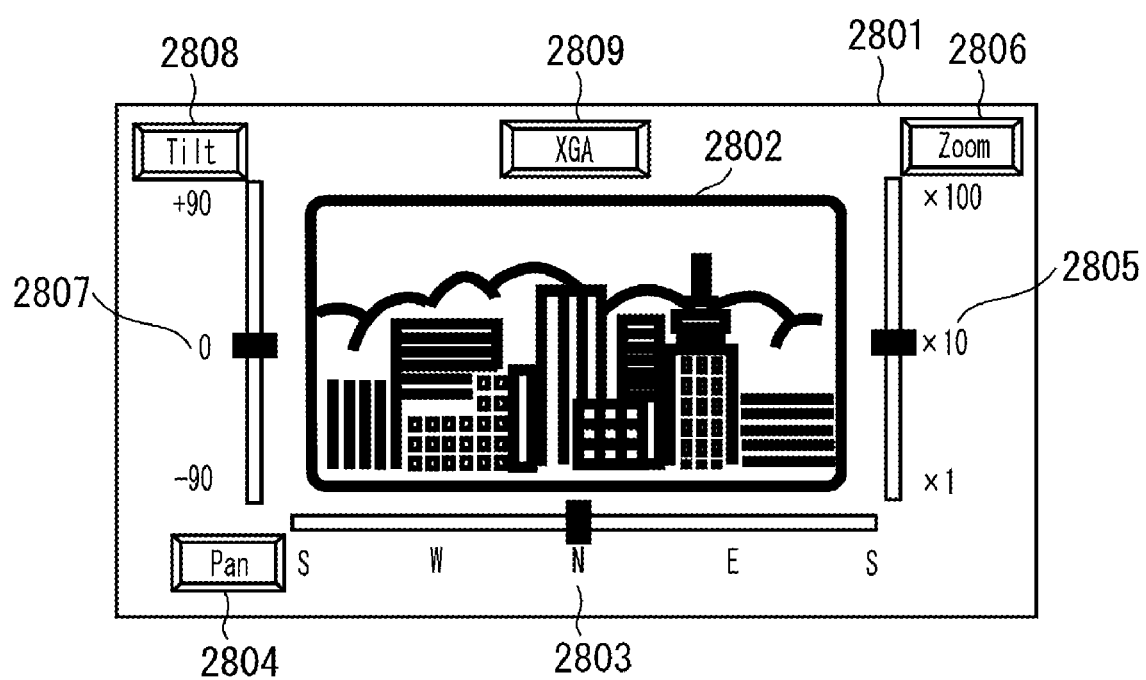
FIG. 28 is a diagram showing an example of a situation of a monitoring operation using a remote camera according to an exemplary embodiment of the present invention.

FIG. 28 shows an example of a situation where a remote camera performs a monitoring operation according to the fifth embodiment. For components 2801 to 2809, as compared with the monitoring operation screen of FIG. 11, a pan range 2803 is only different in that it is set to difference setting information "North, West, South, East" of the center server 201 corresponding to a case of no applied condition. This is because the difference setting information recording data 2704 of FIG. 27 has not been applied as it is set valid only for the operation terminal in the child room 2a under the control of the access point 203.

FIG. 29 shows an example of setting information combined when the camera 217 is operated via the TV 213 according to the fifth embodiment. As indicated by 2901 to 2903 of FIG. 29, setting information when there is no condition is valid.

Next, referring to FIGS. 30 and 31, another embodiment different from the previous embodiments in that the operation is performed via the TV 209 installed in the same child room 2a as that of the access point 203 will be described.

Figure 30:
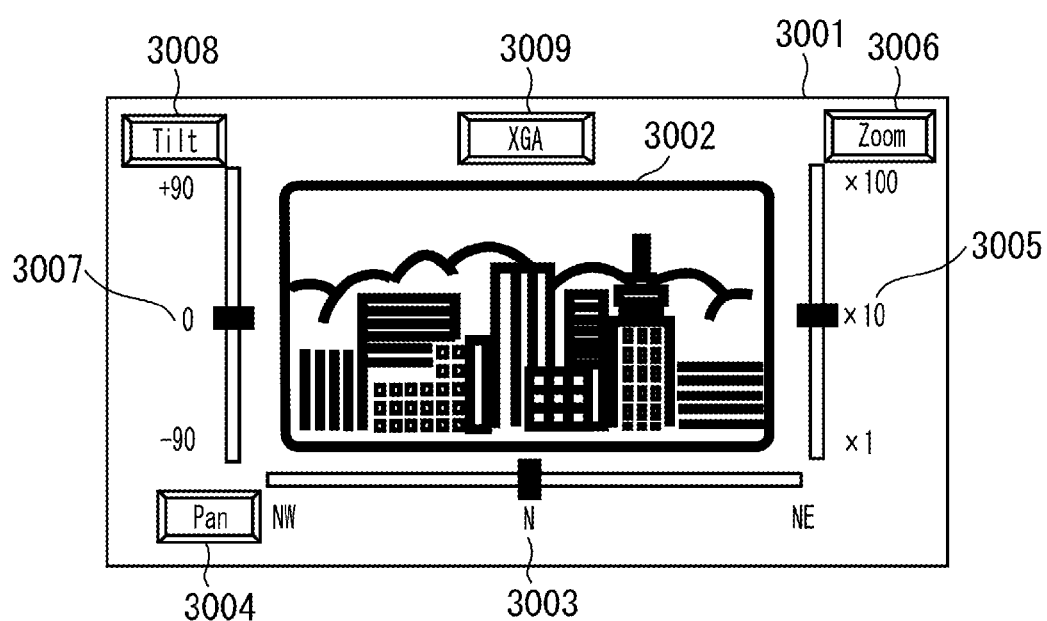
FIG. 30 is a diagram showing an example of a situation of a monitoring operation according to an exemplary embodiment of the present invention.

FIG. 30 shows an example of a situation where the camera 304 of FIG. 3 is subjected to a monitoring operation via the TV 303. For components 3001 to 3009, as compared with the monitoring operation screen of FIG. 28, the only difference is that a pan range 3003 is set to a range near "North". This is because the difference setting information recording data 2704 of FIG. 27 is reflected as the camera is operated via the operation terminal present in the same child room 2a as that of the access point 203.

FIG. 31 shows an example of setting information combined when the camera 217 is operated via the TV 209 according to the fifth embodiment. As indicated by 3101 to 3103 of FIG. 31, for a standard pan range only, difference setting information recorded in the access point 203 becomes valid.

As described above, recording, on an access point, a difference of the setting information limited to the place of the operation terminal facilitates proper use of the setting information limiting the place of the operation terminal.

Sixth Exemplary Embodiment

Figure 32:
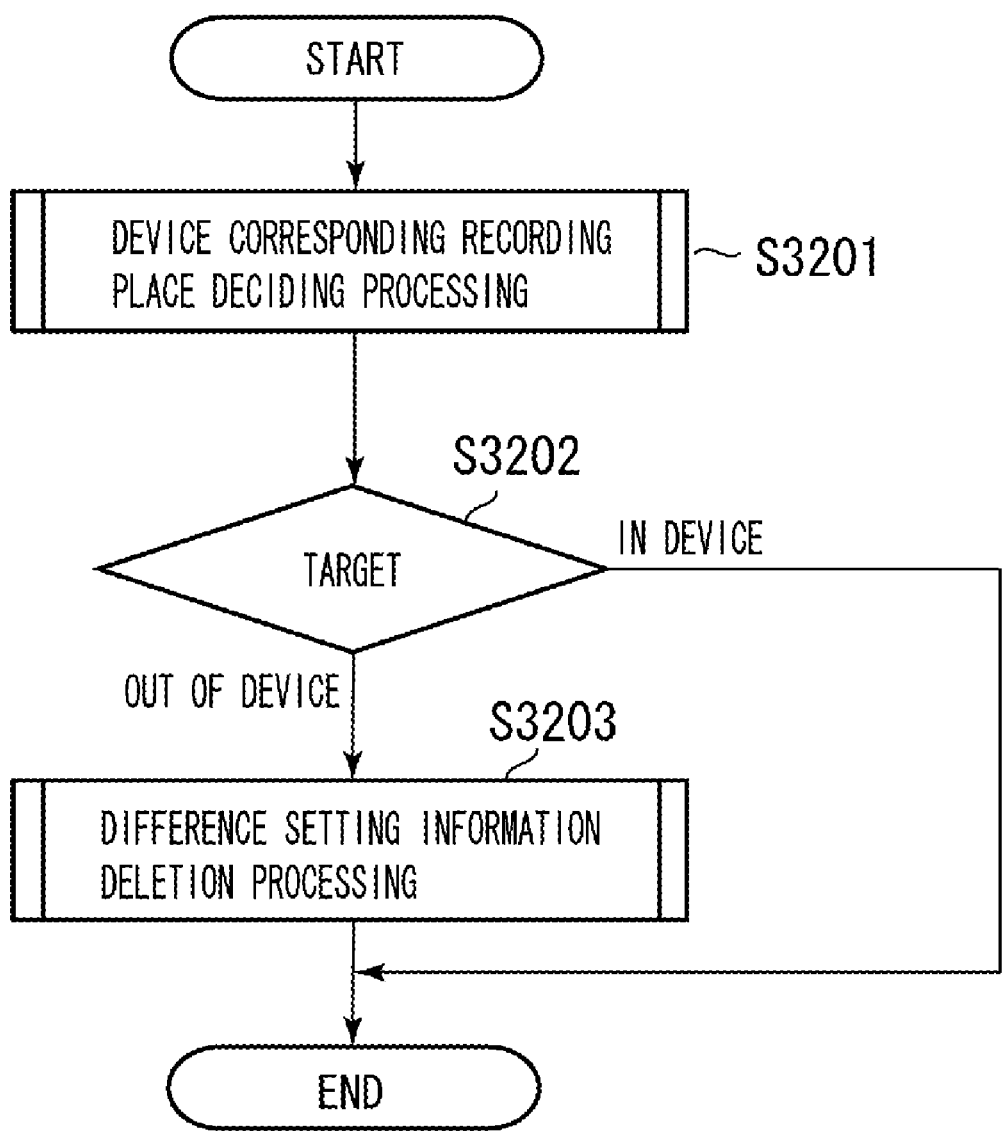
FIG. 32 is a flowchart showing an example device discarding process according to an exemplary embodiment of the present invention.

Referring to FIGS. 32 and 33, a sixth embodiment will be described in which corresponding setting information is associatively deleted when the camera 2201 is discarded from the system described above with reference to FIG. 22.

FIG. 32 is an example flowchart of a device discarding process of the device deletion unit 411 of FIG. 4 in a device discarding process. A recording place corresponding to a device to be discarded is decided in a device corresponding recording place deciding process of step S3201 of FIG. 32. If the recording place is determined to be outside the device in step S3202, in a difference setting information deletion process of step S3203, the difference setting information of the recording place is discarded. Then, the process ends. On the other hand, if it is determined in step S3202 that the recording place is in the device, the process ends without any processing. In other words, if the recording place is present in the device, no processing is necessary as it becomes invalid together with the discarding.

FIG. 33 shows an example of difference setting information recording data after the device discarding process of the sixth embodiment. For data 3301 to 3306, as compared with FIG. 23, only difference is that difference setting information 3306 of the camera 2201 is deleted.

As described above, management of unnecessary setting information can be facilitated.

Seventh Exemplary Embodiment

Referring to FIGS. 34 and 35, a seventh embodiment will be described in which a storage area of corresponding setting information is associatively secured when a new camera is added to the system described above with reference to FIG. 22.

FIG. 34 is an example flowchart of a device addition process of the device addition unit 413 of FIG. 4. A recording place corresponding to a device to be added is decided in a device corresponding recording place deciding process of step S3401 of FIG. 34. If the recording place is determined to be outside the device in step S3402, in a difference setting information area generation process of step S3403, the difference setting information recording area of the recording place is generated. Then, the process ends. On the other hand, if it is determined in step S3402 that the recording place is in the device, the process ends without any processing. In other words, if the recording place is present in the device, no processing is necessary as it becomes valid together with the adding.

FIG. 35 shows an example of difference setting information recording data after the device adding process of the seventh embodiment. As compared with FIG. 33, the difference is that difference setting information recording data 3506 of the new camera is added.

Therefore, as described above, generation of setting information of the newly added device can be facilitated.

Eighth Exemplary Embodiment

Referring to FIGS. 36 to 39, an eighth embodiment will be described in which recording is executed in a storage place for replacement when there is no storage place of setting information corresponding to conditions.

Figure 36:
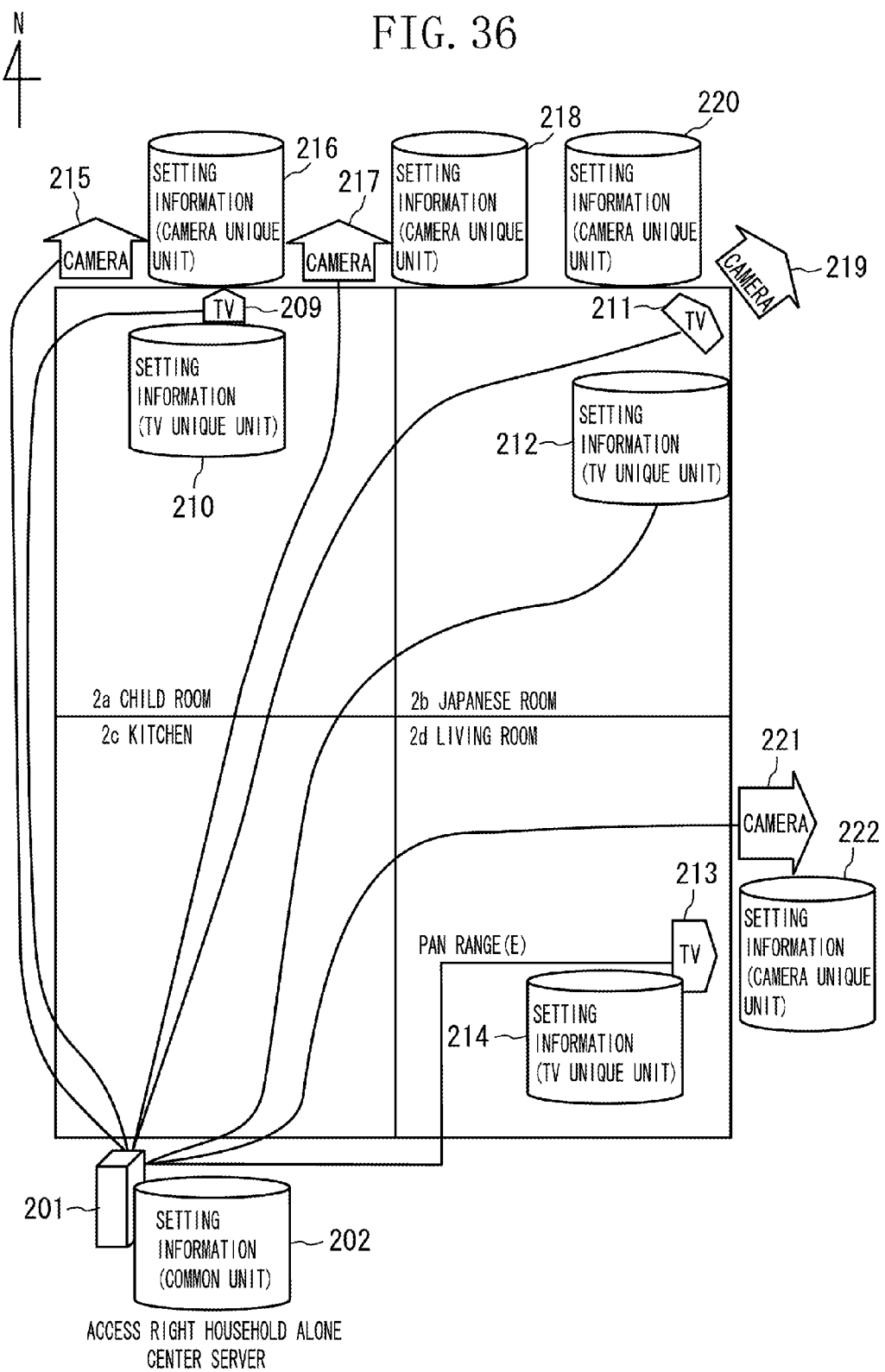
FIG. 36 is a diagram showing an example of a system configuration according to an exemplary embodiment of the present invention.

FIG. 36 shows an example of a system configuration according to the eight embodiment, specifically showing a case of no access point. As there is no access point which is an optimal recording place, difference setting information designating a place of the device of the first embodiment is recorded in the recording place 202 of the center server 201.

Figure 37:
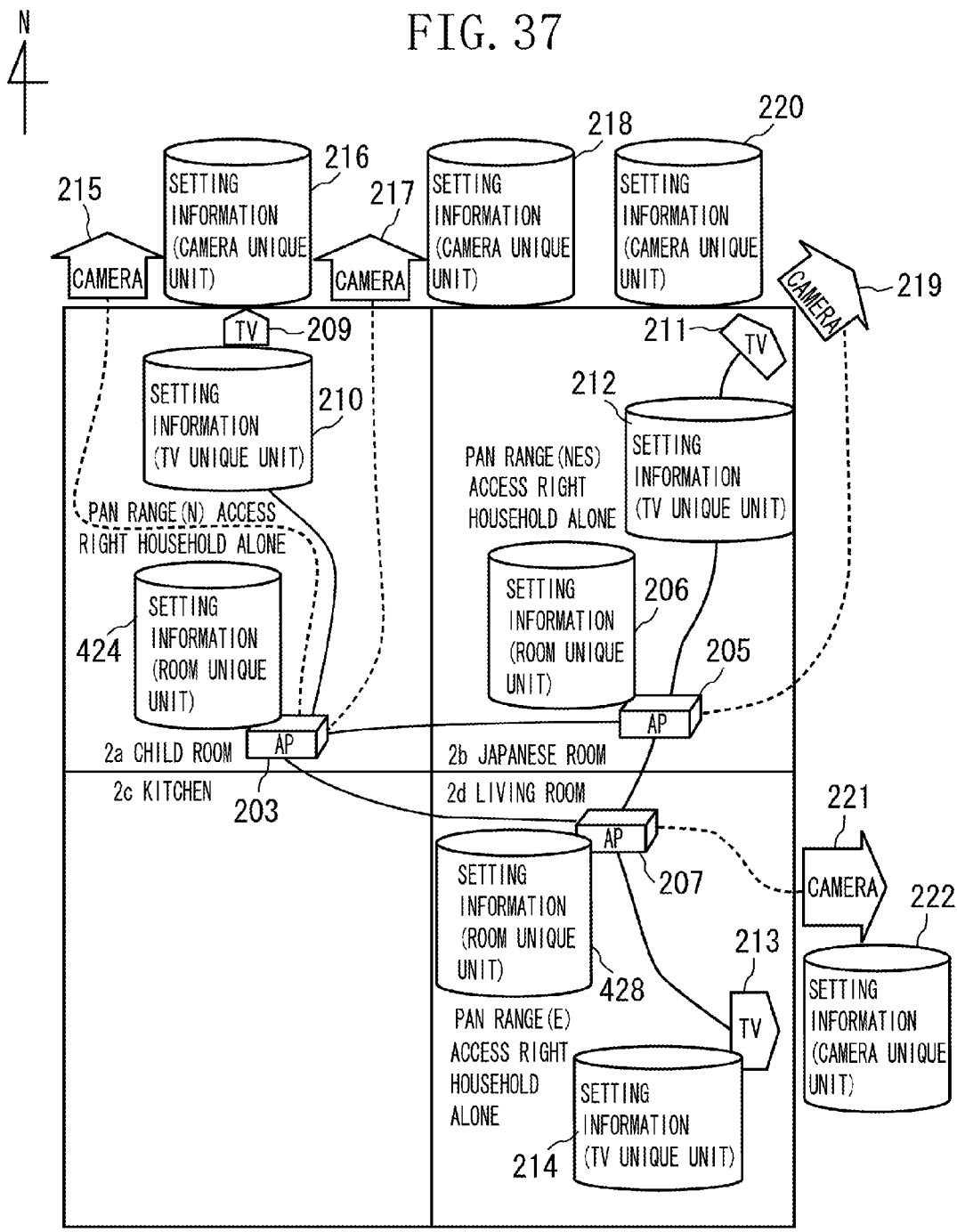
FIG. 37 is a diagram showing an example of a system configuration according to an exemplary embodiment of the present invention.

FIG. 37 shows an example of a system configuration according to the eighth embodiment, specifically showing a case where there is no center server. Setting information of no condition to be originally stored in the center server is stored in all access points in an overlapped manner.

FIG. 38 shows an example of alternative recording place definition data according to the eighth embodiment. In the alternative recording place definition data of FIG. 38, a target recording place, and an alternative recording place when recording in the recording place is impossible are defined. For example, in alternative recording place definition data 3801, as an alternative recording place when recording cannot be carried out in the target recording place "center server", one of "all access points", "all devices", and "all operation terminals" is defined as an alternative candidate. Further, in the alternative recording place definition 3802, for the target recording place "access point", one of "center server", "all devices of corresponding place", and "all operation terminals" is defined as an alternative candidate. By referring to this data, according to the embodiment described above with reference to FIG. 36, difference setting information is recorded in the center server in place of the access point. According to the embodiment described above with reference to FIG. 37, difference setting information is recorded in all of the access points in place of the center server.

Figure 39:
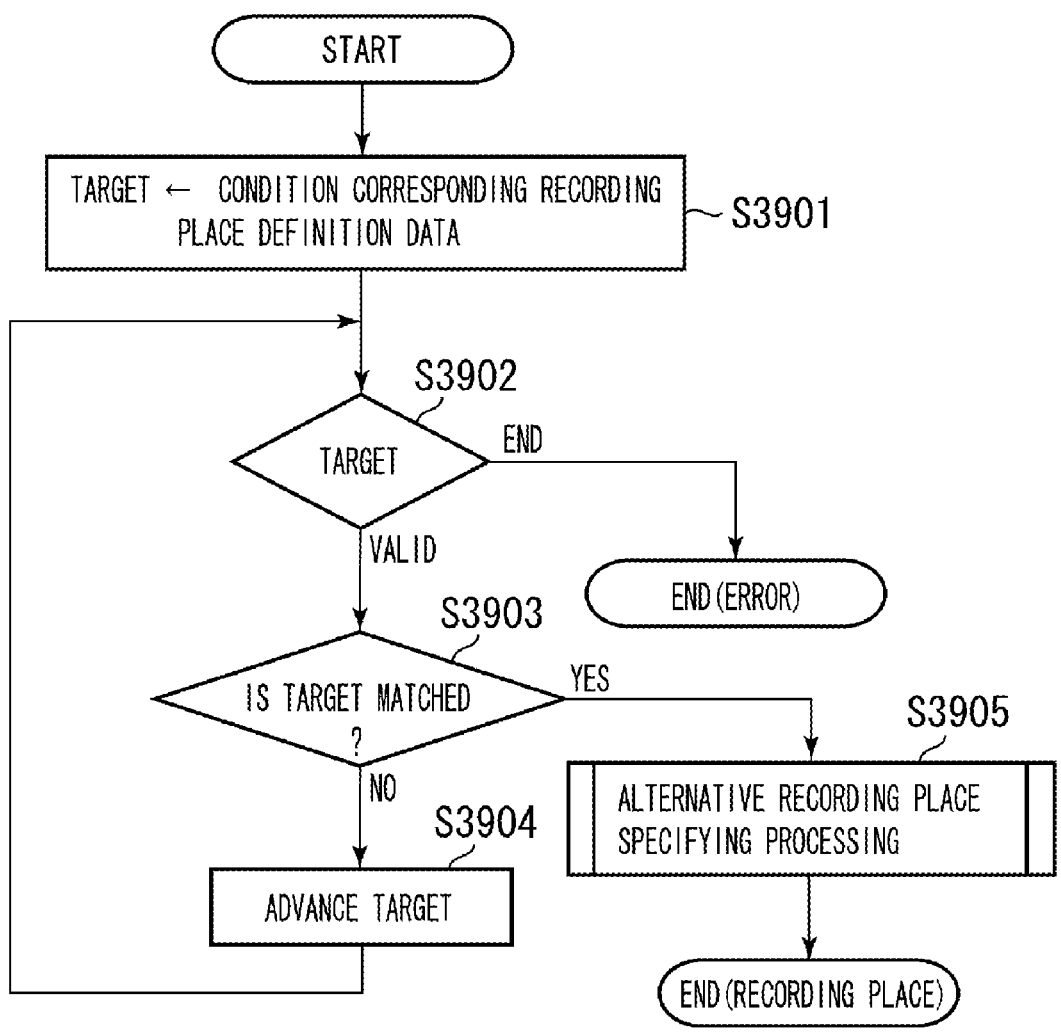
FIG. 39 is a flowchart showing an example flow of a condition corresponding recording place deciding process according to an exemplary embodiment of the present invention.

FIG. 39 shows an example flow of a condition corresponding recording place deciding process of the condition corresponding recording place generation unit 414 of FIG. 4. In step S3901 of FIG. 39, a target is initialized at a head of condition corresponding recording place definition data, and a process of step S3902 and subsequent steps is repeated. If the target is not determined to be valid in step S3902, the process ends as an error by determining that there is no alternative place to record the difference setting information. On the other hand, if the target is determined to be valid in step S3902, a determination is made as to matching of a target recording place in step S3903. If matching is not determined (NO in step S3903), the target is advanced in step S3904, and the process returns to step S3902 to repeat the processing. If matching of the target recording place is determined in step S3903 (YES in step S3903), in an alternative recording place specifying process of step S3905, an alternative recording place is specified according to definition of alternative recording place definition data. Then, the process ends.

As described above, the setting information can be held even when there is no best recording place.

Ninth Exemplary Embodiment

Referring to FIGS. 40 to 43, a ninth embodiment will be described in which a difference information combination of dispersed setting information is changed under conditions to specify a device at a high abstract level.

Figure 40:
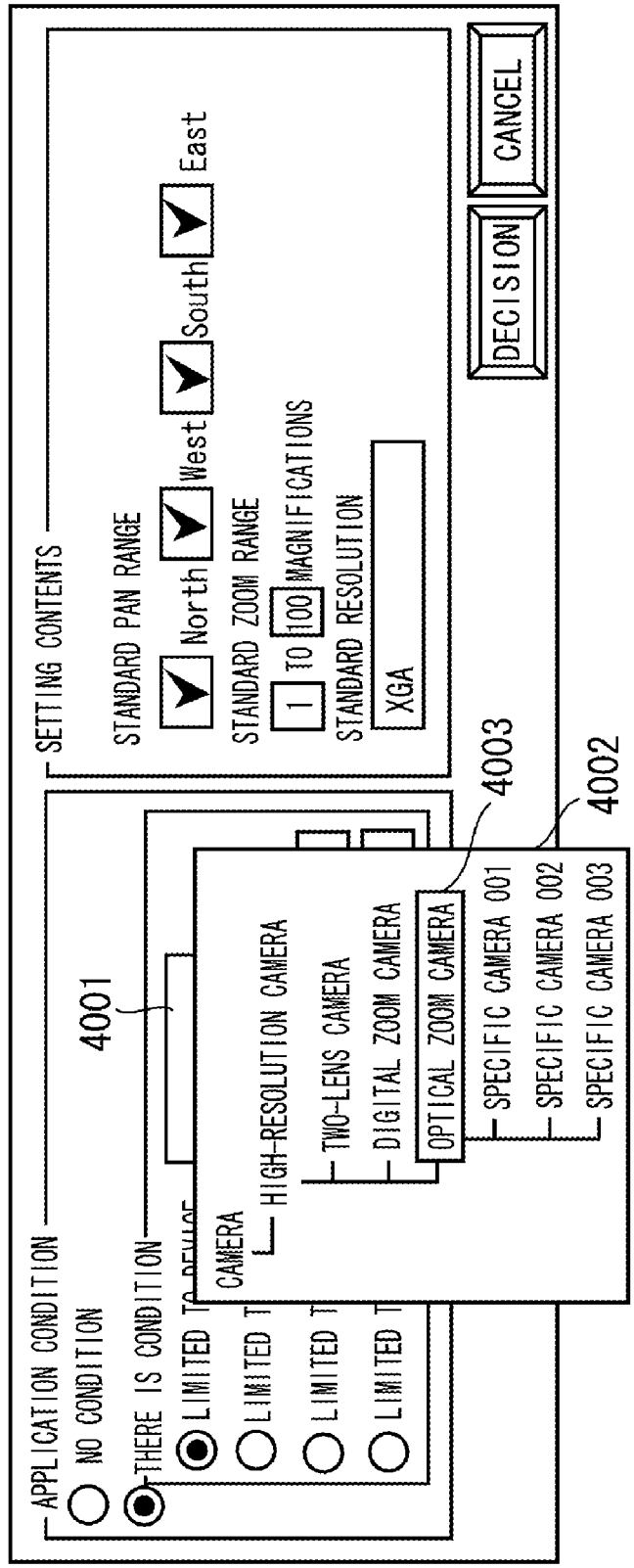
FIG. 40 is a diagram showing an example of a situation of a device setting operation according to an exemplary embodiment of the present invention.

FIG. 40 shows an example of a situation of a device setting operation according to the ninth embodiment. In particular, a situation where a device is not uniquely specified but a device type is designated abstractly is shown. Specifically, a device selection pop-up window 4002 is displayed by designating "limited to device" as an application condition on a device setting operation screen 4001 shown in FIG. 40, and "optical zoom camera" 4003 is designated.

FIG. 41 shows an example of a condition corresponding recording place definition data according to the ninth embodiment. Condition corresponding recording place definition data 4102 defining a storage place in a center server when a device is abstractly limited is added to definition data 4101 and 4103 to 4106 similar to those of FIG. 7.

FIG. 42 shows an example of difference setting information recording data according to the ninth embodiment. As shown in FIG. 42, difference setting information recording data 4204 of standard resolution "SXGA" is set in addition to difference setting information 4201 to 4203 of "optical zoom camera" limiting a device recorded in the center server at an abstract level.

FIG. 43 shows an example flow of a setting information combining process of the setting information combining unit 409 of FIG. 4. Standard setting information when there is no condition is obtained in a center server setting information obtaining process of step S4301 of FIG. 43. In an access point setting information overwriting process of step S4302, the setting information is overwritten with difference setting information corresponding to a place of an operation target device stored in the access point and difference setting information corresponding to a place of an operation terminal. In a center server abstract device setting information overwriting process of step S4303, the setting information is overwritten with difference setting information of an abstract device to which the operation target device belongs. The setting information is overwritten with difference setting information of the operation target device in a device setting information overwriting process of step S4304. The setting information is overwritten with difference setting information of the operation terminal in an operation terminal setting information overwriting process of step S4305. Then, the process ends.

As described above, a common use range of the setting information can be expanded by correlating the setting information at a higher abstract level.

Other Exemplary Embodiments

The aforementioned embodiments have been described by way of a case where the camera control is carried out via the TV. However, the invention can be applied in the case of customizing according to a user when a portal site is browsed on a web of the Internet using a general PC. For example, a server has common information of a portal site, a user's PC has a moving image photographed by the user as difference information. By combining these, the portal site in which the moving image photographed by the user himself is displayed as a background can be browsed.

The present invention can be applied to a system including a plurality of devices (e.g., a host computer, an interface device, a reader, a printer, and the like), or to an apparatus (e.g., a copying machine, a facsimile device or the like) including one device. For example, the invention can employ an embodiment of a system, an apparatus, a method, a program or a storage medium. For example, a software program (program corresponding to the shown flowcharts according to the embodiments) for realizing the functions of the embodiments is supplied to a system or an apparatus directly or from a remote place. Then, a computer of the system or the apparatus reads the supplied program code to execute it.

Thus, the program code itself installed in the computer to realize the functional process of the invention can be used also for realizing the invention. In other words, the computer program itself for realizing the functional process of the invention is also within the invention.

In this case, as long as the program function is provided, a form such as an object code, a program executed by an interpreter, or script data supplied to an operating system (OS) may be employed.

As a recording medium for supplying a program, for example, a flexible disk, a hard disk, or an optical disk is available. Additionally, as recording media, there are a magneto-optical disk, an MD, a CD-ROM, a CD-R, a CD-RW, a magnetic tape, a nonvolatile memory card, a ROM, a DVD (DVD-ROM, DVD-R).

According to a program supply method, a home page of the Internet is connected by using a browser of a client computer. The computer program of the invention is supplied from the home page of the connection destination, or a compressed file containing an automatic installing function is downloaded in a recording medium such as a hard disk to be supplied.

The present invention can be realized by classifying program code for the program into a plurality of files and downloading files from different home pages. In other words, a WWW server which causes a plurality of users to download program files to realize the functional process of the invention by the computer is also within the invention. The program of the invention can be encrypted and stored in a storage medium such as a CD-ROM to be distributed to users. The users who satisfy predetermined conditions are permitted to download key information to decrypt the program from the home page via the Internet. Then, the encrypted program can be executed by using the key information, and installed in the computer to be realized.

By executing the read program through the computer, the functions of the embodiments can be realized. Based on instructions of the program, the OS or the like operating on the computer executes a part or all of an actual process, and the functions of the embodiments can be realized by this process.

The program read from the recording medium is written in a memory disposed in a function expansion board inserted into the computer, or a function expansion unit connected to the computer. Subsequently, based on the program instruction, a CPU or the like installed in the function expansion board or the function expansion unit executes a part or all of an actual process, and the functions of the embodiments are realized by this process.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-301844 filed Oct. 17, 2005, which is hereby incorporated by reference here in its entirety.

What is claimed:

1. An information processing apparatus configured to be in communication with an external apparatus having common information of setting information via a network, the information processing apparatus comprising:

a difference information recording unit configured to record difference information with respect to the common information;

an obtaining unit configured to obtain the common information;

a combination unit configured to combine the difference information with the obtained common information to generate combined setting information;

an application unit configured to apply the generated combined setting information;

a designation unit configured to be in communication with a plurality of information processing apparatuses and configured to designate a designee information processing apparatus to which the setting information is applied; and a recording apparatus deciding unit configured to determine the information processing apparatus on which the difference information is recorded in accordance with the designation.

2. The information processing apparatus according to claim 1, further comprising:

a plurality-of-difference-information obtaining units configured to obtain a plurality of difference information recorded on a plurality of information processing apparatuses decided by the recording apparatus deciding unit;

a plurality-of-information combination units configured to combine together the common information obtained by the obtaining unit, the difference information recorded on the difference information recording unit, and the plurality of difference information obtained by the plurality-of-difference-information obtaining unit to generate combined setting information; and a plurality-of-information application units configured to apply the combined setting information generated by the plurality-of-information combination unit.

3. The information processing apparatus according to claim 1, further comprising a deletion unit configured to delete difference information with respect to the setting information.

4. The information processing apparatus according to claim 1, further comprising an addition unit configured to add new difference information with respect to the setting information.

5. The information processing apparatus according to claim 1, further comprising an alternative recording apparatus deciding unit configured to decide an alternative recording apparatus if no recording apparatus is decided by the recording apparatus deciding unit.

6. The information processing apparatus according to claim 1, wherein the plurality of information processing apparatuses are configured in hierarchical layers, wherein the designation unit designates one of the hierarchical layers, and wherein the recording apparatus deciding unit decides a recoding apparatus according to the designated layer.

7. The information processing apparatus according to claim 1, wherein the setting information includes at least one of camera setting information, printer setting information, and web page setting information.

8. A method for controlling an information processing apparatus in communication with an external apparatus having common information of setting information via a network, the method comprising:

recording difference information with respect to the common information on a difference information recording unit;

obtaining the common information;

combining the recorded difference information with the obtained common information obtained to generate combined setting information;

applying the combined setting information;

designating a designee information processing apparatus, from a plurality of information processing apparatuses, to which the setting information is applied; and determining the information processing apparatus on which the difference information is recorded in accordance with the designation.

9. A non-transitory computer-readable storage medium encoded with a program for executing a control method for an information processing apparatus connected to an external apparatus having common information of setting information via a network, the computer-readable storage medium including:

program code for recording difference information with respect to the common information on a difference information recording unit;

program code for obtaining the common information;

program code for combining the recorded difference information with the obtained common information to generate combined setting information;

program code for applying the combined setting information;

program code for designating a designee information processing apparatus, from a plurality of information processing apparatuses, to which the setting information is applied; and program code for determining the information processing apparatus on which the difference information is recorded in accordance with the designation.

10. An information processing system including a server and an information processing apparatus in communication via a network, the information processing system comprising:

a common information recording unit configured to record common information of setting information;

a difference information recording unit configured to record difference information with respect to the common information recorded on the common information recoding unit;

a combination unit configured to combine the difference information recorded on the difference information recording unit with the common information recorded on the common information recording unit to generate combined setting information;

an application unit configured to apply the combined setting information generated by the combination unit;

a designation unit configured to be in communication with a plurality of information processing apparatuses and configured to designate a designee information processing apparatus to which the setting information is applied; and a recording apparatus deciding unit configured to determine the information processing apparatus on which the difference information is recorded in accordance with the designation.

* * * * *